US010055300B2

(12) United States Patent
Zhang et al.

(10) Patent No.: US 10,055,300 B2
(45) Date of Patent: Aug. 21, 2018

(54) DISK GROUP BASED BACKUP

(71) Applicant: Actifio, Inc., Waltham, MA (US)

(72) Inventors: Xiangdong Zhang, Wellesley, MA (US); Madhav Mutalik, Southborough, MA (US); Satya Sri Kanth Palaparthi, Waltham, MA (US); Yeganjaiah Gottemukkula, Lexington, MA (US); Sachindra Kumar, Framingham, MA (US); Uday Tekade, Westford, MA (US)

(73) Assignee: Actifio, Inc., Waltham, MA (US)

( * ) Notice: Subject to any disclaimer, the term of this patent is extended or adjusted under 35 U.S.C. 154(b) by 216 days.

(21) Appl. No.: 14/993,789

(22) Filed: Jan. 12, 2016

(65) Prior Publication Data

US 2016/0203054 A1 Jul. 14, 2016

Related U.S. Application Data

(60) Provisional application No. 62/102,393, filed on Jan. 12, 2015.

(51) Int. Cl.
*G06F 17/30* (2006.01)
*G06F 11/14* (2006.01)

(52) U.S. Cl.
CPC ...... *G06F 11/1451* (2013.01); *G06F 11/1453* (2013.01); *G06F 11/1456* (2013.01);
(Continued)

(58) Field of Classification Search
None
See application file for complete search history.

(56) References Cited

U.S. PATENT DOCUMENTS

| 4,626,829 A | 12/1986 | Hauck |
| 5,381,545 A | 1/1995 | Baker et al. |

(Continued)

OTHER PUBLICATIONS

Alapati, "NetApp Technical Report: SnapMirror Sync and SnapMirror Semi-Sync Overview and Design Considerations," NetApp, Jul. 2010 (24 pages).

(Continued)

*Primary Examiner* — Wilson Lee
(74) *Attorney, Agent, or Firm* — Wilmer Cutler Pickering Hale and Dorr LLP

(57) ABSTRACT

Systems and methods for backing up clustered databases such that production backups associated with the clustered databases are restorable with near zero downtime. First data indicative of a backup request of a clustered database is transmitted by a first computing device to a second computing device. The first computing device maps the backup staging disks to each of a plurality of nodes. The second computing device adds the mapped staging disks to a backup staging diskgroup on a primary node. The second computing device mounts the backup staging diskgroup to each of the plurality of nodes. The second computing device executes a full backup from at least one of the plurality of nodes to the backup staging diskgroup. The second computing device transmits a catalog of backup information to a database associated with the first computing device. The first computing device creates a snapshot of the first backup staging disk.

10 Claims, 11 Drawing Sheets

(52) U.S. Cl.
CPC .... *G06F 11/1469* (2013.01); *G06F 17/30306* (2013.01); *G06F 17/30312* (2013.01); *G06F 2201/80* (2013.01); *G06F 2201/84* (2013.01)

(56) References Cited

U.S. PATENT DOCUMENTS

| | | | |
|---|---|---|---|
| 5,410,667 | A | 4/1995 | Belsan et al. |
| 5,497,483 | A | 3/1996 | Beardsley et al. |
| 5,535,381 | A | 7/1996 | Kopper |
| 5,819,292 | A | 10/1998 | Hitz et al. |
| 5,828,876 | A | 10/1998 | Fish et al. |
| 5,857,208 | A | 1/1999 | Ofek |
| 5,963,962 | A | 10/1999 | Hitz et al. |
| 6,065,018 | A | 5/2000 | Beier et al. |
| 6,081,875 | A | 6/2000 | Clifton et al. |
| 6,119,208 | A | 9/2000 | White et al. |
| 6,131,148 | A | 10/2000 | West et al. |
| 6,148,412 | A | 11/2000 | Cannon et al. |
| 6,163,856 | A | 12/2000 | Dion et al. |
| 6,192,444 | B1 | 2/2001 | White et al. |
| 6,199,146 | B1 | 3/2001 | Pence |
| 6,202,071 | B1 | 3/2001 | Keene |
| 6,212,531 | B1 | 4/2001 | Blea et al. |
| 6,226,759 | B1 | 5/2001 | Miller et al. |
| 6,269,381 | B1 | 7/2001 | St. Pierre et al. |
| 6,269,431 | B1 | 7/2001 | Dunham |
| 6,324,548 | B1 | 11/2001 | Sorenson |
| 6,330,614 | B1 | 12/2001 | Aggarwal et al. |
| 6,434,681 | B1 | 8/2002 | Armangau |
| 6,460,055 | B1 | 10/2002 | Midgley et al. |
| 6,484,186 | B1 | 11/2002 | Rungta |
| 6,487,561 | B1 | 11/2002 | Ofek et al. |
| 6,557,089 | B1 | 4/2003 | Reed et al. |
| 6,625,704 | B2 | 9/2003 | Winokur |
| 6,654,772 | B1 | 11/2003 | Crow et al. |
| 6,654,912 | B1 | 11/2003 | Viswanathan et al. |
| 6,665,815 | B1 | 12/2003 | Goldstein et al. |
| 6,668,264 | B1 | 12/2003 | Patterson et al. |
| 6,772,302 | B1 | 8/2004 | Thompson |
| 6,779,094 | B2 | 8/2004 | Selkirk et al. |
| 6,823,336 | B1 | 11/2004 | Srinivasan et al. |
| 6,823,436 | B2 | 11/2004 | Krishnamurthy |
| 6,850,929 | B2 | 2/2005 | Chang et al. |
| 6,898,688 | B2 | 5/2005 | Martin et al. |
| 6,915,397 | B2 | 7/2005 | Lubbers et al. |
| 6,928,526 | B1 | 8/2005 | Zhu et al. |
| 6,948,039 | B2 | 9/2005 | Biessener et al. |
| 6,957,362 | B2 | 10/2005 | Armangau |
| 7,072,916 | B1 | 7/2006 | Lewis et al. |
| 7,143,251 | B1 | 11/2006 | Patterson |
| 7,222,194 | B2 | 5/2007 | Kano et al. |
| 7,325,111 | B1 | 1/2008 | Jiang |
| 7,346,623 | B2 | 3/2008 | Prahlad et al. |
| 7,386,695 | B2 | 6/2008 | Fuente |
| 7,389,300 | B1 | 6/2008 | Shah et al. |
| 7,428,657 | B2 | 9/2008 | Yamasaki |
| 7,647,355 | B2 | 1/2010 | Best et al. |
| 7,689,633 | B1 | 3/2010 | Li et al. |
| 7,707,184 | B1 | 4/2010 | Zhang et al. |
| 7,814,128 | B2 | 10/2010 | Silvers et al. |
| 7,937,547 | B2 | 5/2011 | Liu et al. |
| 8,037,032 | B2 | 10/2011 | Pershin et al. |
| 8,139,575 | B2 | 3/2012 | Biran et al. |
| 8,150,808 | B2 | 4/2012 | Zha et al. |
| 8,180,740 | B1 | 5/2012 | Stager et al. |
| 8,180,742 | B2 | 5/2012 | Claudatos et al. |
| 8,299,944 | B2 | 10/2012 | Provenzano |
| 8,407,191 | B1 | 3/2013 | Nanda |
| 8,706,833 | B1 | 4/2014 | Bergant et al. |
| 8,788,769 | B2 | 7/2014 | Abercrombie et al. |
| 9,098,432 | B1 | 8/2015 | Bachu et al. |
| 2002/0129214 | A1 | 9/2002 | Sarkar |
| 2003/0101321 | A1 | 5/2003 | Ohran |
| 2003/0140070 | A1 | 7/2003 | Kaczmarski et al. |
| 2004/0199570 | A1 | 10/2004 | Terao |
| 2005/0066095 | A1 | 3/2005 | Mullick et al. |
| 2005/0165794 | A1 | 7/2005 | Mosescu |
| 2006/0047712 | A1 | 3/2006 | Shitomi et al. |
| 2006/0074945 | A1 | 4/2006 | Mori |
| 2006/0190243 | A1* | 8/2006 | Barkai ............. G06F 17/30486 704/8 |
| 2009/0222496 | A1 | 9/2009 | Liu et al. |
| 2009/0307285 | A1 | 12/2009 | Gipp et al. |
| 2011/0047405 | A1 | 2/2011 | Marowsky-Bree et al. |
| 2011/0184915 | A1* | 7/2011 | Wu ................... G06F 17/30575 707/674 |
| 2011/0258161 | A1 | 10/2011 | Constantinescu et al. |
| 2013/0339302 | A1 | 12/2013 | Zhang et al. |
| 2014/0052693 | A1 | 2/2014 | Zha et al. |
| 2015/0143064 | A1 | 5/2015 | Bhargava et al. |
| 2016/0283335 | A1* | 9/2016 | Yao ..................... G06F 11/2023 |
| 2017/0068595 | A1* | 3/2017 | Nautiyal ............ G06F 11/0793 |

OTHER PUBLICATIONS

American Megatrends, Inc., "StorTrends/ManageTrends® (Version 2.7) User's Guide for the StorTends 1300 Storage Appliance" Mar. 23, 2009 (378 pages).

Arrell et al., "Using RVA and SnapShot for Business Intelligence Applications with OS/390 and DB2," IBM, Redbooks, Aug. 1998 (70 pages).

Azagury et al., "Point-in-Time Copy: Yesterday, Today and Tomorrow," IBM Research Lab in Haifa, No Date Listed (pp. 259-270).

Baird, "Virtual Storage Architecture Guide (VSAG)," IEEE, No Month Listed 1995 (pp. 312-326).

Baker, "Disk-Based Mirroring Is a Lot More Than Just Safe," Computer Technology Review, No Month Listed 2000 (pp. 55-57).

Brown et al., "SnapMirror and SnapRestore: Advances in Snapshot Technology," retrieved online [URL:<<https://web.archive.org/web/20011126183455/http://www.netapp.com/tech_library/3043.html>>] No Date Listed (13 pages).

Cederqvist et al., "Version Management with CVS," No Month Listed 1992 (122 pages).

Chang et al., "Performance Analysis of Two Frozen Image Based Backup/Restore Methods," IEEE International Conference on Electron Information Technology 2005, May 22-25, 2005 (7 pages).

Chapman et al., "SnapMirror® Best Practices Guide," Network Appliance, Inc., Apr. 2006 (63 pages).

Chatterjee et al., "Efficient Replication Leveraging Information Lifecycle Management in Data Storage Systems," Provisional Patent Application No. Not Available, Feb. 9, 2009 (25 pages).

Chervenak et al., "Protecting File Systems: A Survey of Backup Techniques," Sixth Goddard Conference on Mass Storage Systems and Technologies, Fifteenth IEEE Symposium on Mass Storage Systems, College Park, Maryland, Mar. 23-26, 1998 (17 pages).

Chutani et al., "The Episode File System," Usenix Association, Proceedings of the Winter 1992 Usenix Conference, San Francisco, California, Jan. 20-24, 1992 (19 pages).

CommVault, "CommVault® Simpana® Quick Recovery® Software for Critical Data Center Applications and File Systems," No Month Listed 2010 (35 pages).

Dantz Development Corporation, "Retrospect® User's Guide," No Month Listed 2002 (262 pages).

Degwekar, "Using SnapMirror® with SnapDrive® for Unix®," No Month Listed 2007 (11 pages).

Delphix Corp.'s Invalidity Contentions Under Patent L.R. 3-3, Jul. 24, 2014 (27 pages).

Edwards et al., "FlexVol: Flexible, Efficient File Volume Virtualization in WAFL," Usenix Association, Usenix '08: 2008 Usenix Annual Technical Conference, No Month Listed 2008 (pp. 129-142).

You et al., "Deep Store: An Archival Storage System Architecture," Proceedings of the 21st International Conference on Data Engineering, No Month Listed 2005 (12 pages).

Zhang et al., "yFS: A Journaling File System Design for Handling Large Data Sets with Reduced Seeking," Usenix Association, Pro-

(56) References Cited

OTHER PUBLICATIONS ceedings of FAST '03: 2nd Usenix Conference on File and Storage Technologies, San Francisco, California, Mar. 31-Apr. 2, 2003 (15 pages).
EMC, "Backup of Oracle in EMC Symmetrix Environments with EMC NetWorker PowerSnap," Aug. 2008 (25 pages).
Zhu et al., "Avoiding the Disk Bottleneck in the Data Domain Deduplication File System," Proceedings of the 6th Usenix Conference on File and Storage Technologies FAST 2008, San Jose, California, No Month Listed 2008 (14 pages).
EMC, "EMC Celerra Version 5.6 Technical Primer: SLA-Driven Replication with Celerra Replicator (V2): Technology Concepts and Business Considerations," Jul. 2008 (20 pages).
EMC, "EMC DL1500 and DL3000 with EMC NetWorker: Best Practices Planning," Jul. 2009 (36 pages).
EMC, "EMC TimeFinder Product Description Guide," No Date Listed (34 pages).
EMC, "Next-Generation Backup-to-Disk: Building the Foundation for Effective Operational Recovery Management," Jan. 31, 2005 (9 pages).
EMC, "Unified Backup and Recovery with EMC NetWorker," Mar. 2010 (16 pages).
Exhibit 1004 IPR2015-01689, Declaration of Ellie Young, Aug. 5, 2015 (24 pages).
Exhibit 1006 IPR2015-01678, Pfaffenberger, Webster's New World Computer Dictionary Ninth Edition, Hungry Minds, Inc., New York, New York, No Month Listed 2001 (4 pages).
Exhibit 1006 IPR2015-01689, File History for U.S. Appl. No. 12/947,393, Apr. 14, 2015 (108 pages).
Exhibit 1006v2 IPR2015-01689, Version 2, File History for U.S. Appl. No. 12/947,393, No Date Listed (177 pages).
Exhibit 1006v3 IPR2015-01689, Version 3, File History for U.S. Appl. No. 12/947,393, No Date Listed (150 pages).
Exhibit 1006v4 IPR2015-01689, Version 4, File History for U.S. Appl. No. 12/947,393, No Date Listed (98 pages).
Exhibit 1007 IPR2015-01678, Microsoft Computer Dictionary Fourth Edition, Microsoft Press, Redmond, Washington, No Month Listed 1999 (3 pages).
Exhibit 1007 IPR2015-01689, Declaration of Prashant Shenoy, Ph.D. in Support of Petition for Inter Partes Review, Aug. 5, 2015 (82 pages).
Exhibit 1008 IPR2015-01678, File History for U.S. Appl. No. 12/947,438, Apr. 14, 2015 (100 pages).
Exhibit 1008v2 IPR2015-01678, Version 2, File History for U.S. Appl. No. 12/947,438, No Date Listed (103 pages).
Exhibit 1009 IPR2015-01678, Declaration of Prashant Shenoy, Ph.D. in Support of Petition for Inter Partes Review, Aug. 5, 2015 (58 pages).
Exhibit 1010 IPR2015-01678, Rivest, "The MD5 Message-Digest Algorithm," retrieved online at [URL:<<https://www.ietf.org/rfc/rfc1321.txt>>] Apr. 1992 (20 pages).
Exhibit 1011 IPR2015-01678, "Secure Hash Standard," U.S. Department of Commerce, Technology Administration, National Institute of Standards and Technology, FIPS PUB 180-1, Federal Information Processing Standards Publication, Apr. 17, 1995 (24 pages).
Exhibit A-01 to Delphix Corp.'s Preliminary Invalidity and Non-Infringement Contentions, "Data Domain ("Data Domain") as Prior Art to U.S. Pat. No. 6,732,244," Jul. 3, 2015 (7 pages).
Exhibit A-02 to Delphix Corp.'s Preliminary Invalidity and Non-Infringement Contentions, "Symantec NetBackup/Veritas NetBackup ("NetBackup") as Prior Art to U.S. Pat. No. 6,732,244," Jul. 3, 2015 (7 pages).
Exhibit A-03 to Delphix Corp.'s Preliminary Invalidity and Non-Infringement Contentions, "Hitachi ShadowImage ("ShadowImage") as Prior Art to U.S. Pat. No. 6,732,244," Jul. 3, 2015 (7 pages).
Exhibit A-04 to Delphix Corp.'s Preliminary Invalidity and Non-Infringement Contentions, "U.S. Pat. No. 6,269,431 as Prior Art to U.S. Pat. No. 6,732,244," Jul. 3, 2015 (27 pages).
Exhibit A-05 to Delphix Corp.'s Preliminary Invalidity and Non-Infringement Contentions, "U.S. Pat. No. 6,915,397 ("the '397 patent") as Prior Art to U.S. Pat. No. 6,732,244," Jul. 3, 2015 (44 pages).
Exhibit A-06 to Delphix Corp.'s Preliminary Invalidity and Non-Infringement Contentions, "Hutchinson as Claim Chart for U.S. Pat. No. 6,732,244," Jul. 3, 2015 (64 pages).
Exhibit A-07 to Delphix Corp.'s Preliminary Invalidity and Non-Infringement Contentions, "Petal: Distributed Virtual Disks (Lee) as Prior Art to U.S. Pat. No. 6,732,244," Jul. 3, 2015 (35 pages).
Exhibit A-08 to Delphix Corp.'s Preliminary Invalidity and Non-Infringement Contentions, "EMC TimeFinder as Prior Art to U.S. Pat. No. 6,732,244," Jul. 3, 2015 (51 pages).
Exhibit A-09 to Delphix Corp.'s Preliminary Invalidity and Non-Infringement Contentions, "U.S. Pat. No. 6,434,681 as Prior Art to U.S. Pat. No. 6,732,244," Jul. 3, 2015 (19 pages).
Exhibit A-10 to Delphix Corp.'s Preliminary Invalidity and Non-Infringement Contentions, "U.S. Pat. No. 7,072,916 ("the '916 patent") as Prior Art to U.S. Pat. No. 6,732,244," Jul. 3, 2015 (65 pages).
Exhibit A-11 to Delphix Corp.'s Preliminary Invalidity and Non-Infringement Contentions, "U.S. Pat. No. 6,898,688 as Prior Art to U.S. Pat. No. 6,732,244," Jul. 3, 2015 (35 pages).
Exhibit A-12 to Delphix Corp.'s Preliminary Invalidity and Non-Infringement Contentions, "Chervenak as Prior Art to U.S. Pat. No. 6,732,244," Jul. 3, 2015 (21 pages).
Exhibit A-13 to Delphix Corp.'s Preliminary Invalidity and Non-Infringement Contentions, "IBM ADSTAR Distributed Storage Manager ("ADSM")/Tivoli Storage Manager as Prior Art to U.S. Pat. No. 6,732,244," Jul. 3, 2015 (52 pages).
Exhibit A-14 to Delphix Corp.'s Preliminary Invalidity and Non-Infringement Contentions, "Green, Designing a Fast On-line Backup System for a Log-structured File System as Prior Art to U.S. Pat. No. 6,732,244," Jul. 3, 2015 (80 pages).
Exhibit A-15 to Delphix Corp.'s Preliminary Invalidity and Non-Infringement Contentions, "U.S. Pat. No. 5,535,381 as Prior Art to U.S. Pat. No. 6,732,244," Jul. 3, 2015 (53 pages).
Exhibit A-16 to Delphix Corp.'s Preliminary Invalidity and Non-Infringement Contentions, "IBM RAMAC Virtual Array ("RAMAC" or "RVA") as Prior Art to U.S. Pat. No. 6,732,244," Jul. 3, 2015 (68 pages).
Exhibit A-17 to Delphix Corp.'s Preliminary Invalidity and Non-Infringement Contentions, "The Episode File System ("Episode") as Prior Art to U.S. Pat. No. 6,732,244," Jul. 3, 2015 (21 pages).
Exhibit A-18 to Delphix Corp.'s Preliminary Invalidity and Non-Infringement Contentions, "Informix Storage Manager and Database Servers ("Informix") as Prior Art to U.S. Pat. No. 6,732,244," Jul. 3, 2015 (34 pages).
Exhibit A-19 to Delphix Corp.'s Preliminary Invalidity and Non-Infringement Contentions, "U.S. Pat. No. 6,779,094 ("The '094 patent") as Prior Art to U.S. Pat. No. 6,732,244," Jul. 3, 2015 (44 pages).
Exhibit A-20 to Delphix Corp.'s Preliminary Invalidity and Non-Infringement Contentions, "EMC NetWorker/Legato NetWorker ("NetWorker") as Prior Art to U.S. Pat. No. 6,732,244," Jul. 3, 2015 (59 pages).
Exhibit A-21 to Delphix Corp.'s Preliminary Invalidity and Non-Infringement Contentions, "EMC TimeFinder as Prior Art to U.S. Pat. No. 6,732,244," Jul. 3, 2015 (51 pages).
Exhibit A-22 to Delphix Corp.'s Preliminary Invalidity and Non-Infringement Contentions, "Retrospect as Prior Art to U.S. Pat. No. 6,732,244," Jul. 3, 2015 (12 pages).
Exhibit A-23 to Delphix Corp.'s Preliminary Invalidity and Non-Infringement Contentions, "U.S. Pat. No. 6,119,208 to White et al. ("White") as Prior Art to U.S. Pat. No. 6,732,244," Jul. 3, 2015 (25 pages).
Exhibit B-01 to Delphix Corp.'s Preliminary Invalidity and Non-Infringement Contentions, "Data Domain ("Data Domain") as Prior Art to U.S. Pat. No. 6,959,369," Jul. 3, 2015 (10 pages).
Exhibit B-02 to Delphix Corp.'s Preliminary Invalidity and Non-Infringement Contentions, "Hitachi ShadowImage ("ShadowImage") as Prior Art to U.S. Pat. No. 6,959,369," Jul. 3, 2015 (10 pages).

(56) References Cited

OTHER PUBLICATIONS

Exhibit B-03 to Delphix Corp.'s Preliminary Invalidity and Non-Infringement Contentions, "U.S. Pat. No. 6,269,431 as Prior Art to U.S. Pat. No. 6,959,369," Jul. 3, 2015 (42 pages).
Exhibit B-04 to Delphix Corp.'s Preliminary Invalidity and Non-Infringement Contentions, "Green, Designing a Fast On-line Backup System for a Log-structured File System as Prior Art to U.S. Pat. No. 6,959,369," Jul. 3, 2015 (104 pages).
Exhibit B-05 to Delphix Corp.'s Preliminary Invalidity and Non-Infringement Contentions, "U.S. Pat. No. 5,535,381 as Prior Art to U.S. Pat. No. 6,959,369," Jul. 3, 2015 (84 pages).
Exhibit B-06 to Delphix Corp.'s Preliminary Invalidity and Non-Infringement Contentions, "Hutchinson as Claim Chart for U.S. Pat. No. 6,959,369," Jul. 3, 2015 (80 pages).
Exhibit B-07 to Delphix Corp.'s Preliminary Invalidity and Non-Infringement Contentions, "U.S. Patent Application No. 2003/0140070 ("the '070 application") as Prior Art to U.S. Pat. No. 6,959,369," Jul. 3, 2015 (67 pages).
Exhibit B-08 to Delphix Corp.'s Preliminary Invalidity and Non-Infringement Contentions, "U.S. Pat. No. 6,898,688 as Prior Art to U.S. Pat. No. 6,959,369," Jul. 3, 2015 (53 pages).
Exhibit B-09 to Delphix Corp.'s Preliminary Invalidity and Non-Infringement Contentions, "U.S. Pat. No. 6,434,681 as Prior Art to U.S. Pat. No. 6,959,369," Jul. 3, 2015 (44 pages).
Exhibit B-10 to Delphix Corp.'s Preliminary Invalidity and Non-Infringement Contentions, "U.S. Pat. No. 7,072,916 ("the '916 patent") as Prior Art to U.S. Pat. No. 6,959,369," Jul. 3, 2015 (59 pages).
Exhibit B-11 to Delphix Corp.'s Preliminary Invalidity and Non-Infringement Contentions, "Chervenak as Prior Art to U.S. Pat. No. 6,959,369," Jul. 3, 2015 (69 pages).
Exhibit B-12 to Delphix Corp.'s Preliminary Invalidity and Non-Infringement Contentions, "IBM ADSTAR Distributed Storage Manager ("ADSM")/Tivoli Storage Manager as Prior Art to U.S. Pat. No. 6,959,369," Jul. 3, 2015 (54 pages).
Exhibit B-13 to Delphix Corp.'s Preliminary Invalidity and Non-Infringement Contentions, "Petal: Distributed Virtual Disks (Lee) as Prior Art to U.S. Pat. No. 6,959,369," Jul. 3, 2015 (51 pages).
Exhibit B-14 to Delphix Corp.'s Preliminary Invalidity and Non-Infringement Contentions, "U.S. Pat. No. 6,915,397 ("the '397 patent") as Prior Art to U.S. Pat. No. 6,959,369," Jul. 3, 2015 (94 pages).
Exhibit B-15 to Delphix Corp.'s Preliminary Invalidity and Non-Infringement Contentions, "IBM RAMAC Virtual Array ("RAMAC" or "RVA") as Prior Art to U.S. Pat. No. 6,959,369," Jul. 3, 2015 (89 pages).
Exhibit B-16 to Delphix Corp.'s Preliminary Invalidity and Non-Infringement Contentions, "Symantec NetBackup/Veritas NetBackup ("NetBackup") as Prior Art to U.S. Pat. No. 6,959,369," Jul. 3, 2015 (65 pages).
Exhibit B-17 to Delphix Corp.'s Preliminary Invalidity and Non-Infringement Contentions, "EMC NetWorker/Legato NetWorker ("NetWorker") as Prior Art to U.S. Pat. No. 6,959,369," Jul. 3, 2015 (92 pages).
Exhibit B-18 to Delphix Corp.'s Preliminary Invalidity and Non-Infringement Contentions, "Retrospect as Prior Art to U.S. Pat. No. 6,959,369," Jul. 3, 2015 (35 pages).
Exhibit B-19 to Delphix Corp.'s Preliminary Invalidity and Non-Infringement Contentions, "EMC TimeFinder as Prior Art to U.S. Pat. No. 6,959,369," Jul. 3, 2015 (90 pages).
Exhibit B-20 to Delphix Corp.'s Preliminary Invalidity and Non-Infringement Contentions, "Informix Storage Manager and Database Servers ("Informix") as Prior Art to U.S. Pat. No. 6,959,369," Jul. 3, 2015 (70 pages).
Exhibit B-21 to Delphix Corp.'s Preliminary Invalidity and Non-Infringement Contentions, "NetApp Data Protection Solution ("NetApp") as Prior Art to U.S. Pat. No. 6,959,369," Jul. 3, 2015 (58 pages).
Exhibit B-22 to Delphix Corp.'s Preliminary Invalidity and Non-Infringement Contentions, "U.S. Pat. No. 6,119,208 to White et al. ("White") as Prior Art to U.S. Pat. No. 6,959,369," Jul. 3, 2015 (43 pages).
Friess et al., "Windows NT Backup and Recovery with ADSM," IBM, Redbooks, May 1998 (190 pages).
Galli, "Journal File Systems in Linux," Upgrade the European Online Magazine for the IT Professional, vol. 2, No. 6, Dec. 2001 (8 pages).
Garrett et al., "Syncsort Backup Express and NetApp: Advanced Data Protection and Disaster Recovery," Enterprise Strategy Group, Jan. 2009 (19 pages).
Gordon, "High Noon-Backup and Recovery: What Works, What Doesn't and Why," Enterprise Systems Journal, vol. 15, No. 9, Sep. 2000 (5 pages).
Green et al., "Designing a Fast, On-Line Backup System for a Log-Structured File System," Digital Technical Journal, vol. 8, No. 2, No Month Listed 1996 (pp. 32-45).
Gu et al., "DB2 UDB Backup and Recovery with ESS Copy Services," IBM, Redbooks, Aug. 2002 (144 pages).
Hendricks et al., "Improving Small File Performance in Object-Based Storage," Parallel Data Laboratory, Carnegie Mellon University, Pittsburgh, Pennsylvania, May 2006 (21 pages).
Herrin et al., "The Viva File System," retrieved online at [URL:<<http.://www.cs.wisc.edu/~shankar/Viva/viva.html>>] Jun. 14, 1997 (26 pages).
Heyt et al., "Tivoli Storage Manager Version 3.7: Technical Guide," IBM, Redbooks, Dec. 1999 (248 pages).
Hitz et al., "File System Design for an NFS File Server Appliance," Network Appliance, Jan. 19, 1994 (23 pages).
Holton et al., "XFS: A Next Generation Journalled 64-Bit Filesystem with Guaranteed Rate I/O," retrieved online at [URL:<<http://www.sgi.com/Technology/xfs-whitepaper.html] Jun. 5, 1997 (15 pages).
Hutchinson, "Logical vs. Physical File System Backup," Usenix Association, Proceedings of the 3rd Symposium on Operating Systems Design and Implementation, New Orleans, Louisiana, Feb. 1999 (12 pages).
IBM, "IBM RAMAC Virtual Array," IBM, Redbooks, Jul. 1997, (490 pages).
IBM, "Setting Up and Implementing ADSTAR Distributed Storage Manager/400," IBM, Redbooks, Mar. 1995 (350 pages).
Informix Corporation, "Informix Backup and Restore Guide," Dec. 1999 (280 pages).
Informix Corporation, "Informix Storage Manager: Administrator's Guide," Dec. 1999 (166 pages).
Isilon Systems, "Backup and Recovery with Isilon IQ Clustered Storage," Aug. 2007 (19 pages).
Kara, "Ext4, btrfs and the others," Linux-Kongress, The International Linux System Technology Conference, Oct. 30, 2009 (15 pages).
Keeton et al., "A Framework for Evaluating Storage System Dependability," Proceedings of the 2004 International Conference on Dependable Systems and Networks, No Month Listed 2004 (10 pages).
Kim et al., "Volume Management in SAN Environment," IEEE, No Month Listed 2001 (pp. 500-505).
Klivansky, "A Thorough Introduction to FlexClone™ Volumes," Network Appliance, Inc., Oct. 2004 (35 pages).
Klosterman, "Delayed Instantiation Bulk Operations for Management of Distributed, Object-Based Storage Systems," Department of Electrical and Computer Engineering, Carnegie Mellon University, Pittsburgh, Pennsylvania, Aug. 2009 (255 pages).
Kulkarni et al., "Redundancy Elimination Within Large Collections of Files," Usenix Association, Proceedings of the General Track: 2004 Usenix Annual Technical Conference, Boston, MA, Jun. 27-Jul. 2, 2004 (15 pages).
Lee et al., "A Comparison of Two Distributed Disk Systems," Systems Research Center, Palo Alto, California, Apr. 30, 1998 (25 pages).
Lee et al., "Petal: Distributed Virtual Disks," ACM, No Month Listed 1996 (pp. 84-92).

(56) References Cited

OTHER PUBLICATIONS

Legato, "Legato NetWorker Release 6.1 UNIX Version: Administrator's Guide," No Month Listed 2001 (638 pages).
Leins et al., "Tivoli Storage Manager Version 3.7.3 & 4.1: Technical Guide," IBM, Redbooks, Sep. 2000 (368 pages).
Linett et al., "The Real Problems of Backup," Fourth NASA Goddard Conference on Mass Storage Systems and Technologies, College Park, Maryland, Mar. 28-30, 1995 (13 pages).
Merrill et al., "SnapVault Best Practices Guide," NetApp, 2008 (29 pages).
Mesnier et al., "Object-Based Storage," IEEE Communications Magazine, Aug. 2003 (pp. 84-90).
Mesnier et al., "Object-Based Storage," IEEE Potentials, Apr./May 2005 (pp. 31-34).
Milligan et al., "Simplifying Management of Complex Business Operations (A Study of Mainline Storage Virtualization)," CMG 2001 Proceedings, vol. 2, Dec. 2-7, 2001 (13 pages).
Mortimer et al., "ADSM Version 3 Technical Guide," IBM, Redbooks, Dec. 1998 (384 pages).
Mortimer et al., "Using ADSM to Back Up Databases," IBM, Redbooks, Jul. 1998 (618 pages).
Mullender et al., "Immediate Files," Software—Practice and Experience, vol. 14, No. 4, Apr. 1984 (pp. 365-368).
Muller et al., "A High Performance Multi-Structured File System Design," ACM, No Month Listed 1991 (pp. 56-67).
Mushran, "OCFS2: A Cluster File System for Linux: User's Guide for Release 1.4," Jul. 2008 (44 pages).
Muthitacharoen et al., "A Low-Bandwidth Network File System," ACM, No Month Listed 2001 (pp. 174-187).
NetApp, Inc., "Data ONTAP® 7.3 Data Protection: Online Backup and Recovery Guide," Jun. 2008 (405 pages).
NetApp, Inc., "Data ONTAP® 7.3 System Administration Guide," Nov. 2010 (349 pages).
Network Appliance Inc., "Data ONTAP 10.0: Architecture Basic Concepts Guide," Nov. 2006 (18 pages).
Network Appliance Inc., "SnapManager® 2.1 for Oracle® Installation and Administration Guide," Apr. 2007 (272 pages).
Network Appliance, Inc., "Data ONTAP™ 6.3 Command Reference," Network Appliance, Inc., Sunnyvale, California, Aug. 2002 (452 pages).
Network Appliance, Inc., "Network Appliance™ SnapMirror® Software," No Month Listed 2006 (2 pages).
No Author Listed, "FDR InstantBackup™ . . . Innovation Instant Solutions," Innovation Data Processing, No Date Listed (2 pages).
Osuna et al., "Data Protection Strategies in IBM System Storage N Series," IBM, Redbooks, Jun. 2008 (90 pages).
Osuna et al., "IBM System Storage N Series SnapMirror," IBM, Redbooks, Jul. 2006 (124 pages).
Pate et al., "Implementing SnapShot," IBM, Redbooks, Jul. 1999 (214 pages).
Pate et al., "RAMAC Virtual Array, Peer-to-Peer Remote Copy, and IXFP/SnapShot for VSE/ESA," IBM, Redbooks, Jan. 1999 (84 pages).
Pate et al., "RAMAC Virtual Array: Implementing Peer-to-Peer Remote Copy," IBM, Redbooks, Dec. 1998 (140 pages).
Patterson et al., "SnapMirror®: File System Based Asynchronous Mirroring for Disaster Recovery," Usenix Association, Proceedings of the FAST 2002 Conference on File and Storage Technologies, Monterey, California, Jan. 28-30, 2002 (14 pages).
Petition for Inter Partes Review of U.S. Pat. No. 8,299,944 Under 35 U.S.C. §§ 311-319 and 37 C.F.R. §§ 42.1-.80, 42.100-.123, Aug. 6, 2015 (43 pages).
Petition for Inter Partes Review of U.S. Pat. No. 8,788,769 Under 35 U.S.C. §§ 311-319 and 37 C.F.R. §§ 42.1-.80, 42.100-.123, Aug. 7, 2015 (71 pages).
Phillips, "Zumastor Linux Storage Server," Proceedings of the Linux Symposium, vol. 2, Ottawa, Ontario, Canada, Jun. 27-30, 2007 (14 pages).
Prahlad et al., "Method for Managing SnapShots Generated by an Operating System or Other Application," U.S. Appl. No. 60/326,021, filed Sep. 28, 2001 (16 pages).
Quinlan et al., "Venti: A New Approach to Archival Storage," Usenix Association, Proceedings of the FAST 2002 Conference on File and Storage Technologies, Monterey, California, Jan. 28-30, 2002 (14 pages).
Sadagopan et al., "NetApp Technical Report: Oracle Fusion Middleware DR Solution Using NetApp Storage," NetApp., May 2008 (38 pages).
Sarkar, "Instant Image: Transitive and Cyclical Snapshots in Distributed Storage Volumes," Euro-Par 2000, No Month Listed 2000 (pp. 1284-1291).
Schuettinger et al., "Helping DBAs Become More Efficient: NetApp Efficiency and Manageability Advantages," NetApp, Inc., Jul. 2009 (12 pages).
Solid et al., "Network Appliance Adds SnapRestore, SnapMirror to OnTap," Computergram International, Apr. 26, 1999 (2 pages).
Solter et al., "OpenSolaris™ Bible," Wiley Publishing, Inc. Indianapolis, Indiana, No Month Listed 2009 (9 pages).
Sweeney, "xFS In-core Inode Management," retrieved online at [URL:<<http://linux-xfs.sgi.com/projects/xfs/design_docs/>>] Nov. 29, 1993 (10 pages).
Symantec Corporation, "Symantec Backup Exec Quick Recovery & Off-Host Backup Solutions for Microsoft Exchange Server 2003 & Microsoft SQL Server," No Month Listed 2005 (9 pages).
Syncsort Incorporated, "Near-Instant Oracle Cloning with Syncsort AdvancedClient Technologies," No Month Listed 2007 (12 pages).
Syncsort Incorporated, "Syncsort Backup Express Advanced Recovery for NetApp," No Month Listed 2008 (12 pages).
Tate et al., "Implementing the IBM System Storage SAN Volume Controller V4.3," IBM, Redbooks, Oct. 2008 (970 pages).
Thekkath et al., "Frangipani: A Scalable Distributed File System," Proceeding SOSP '97, Proceedings of the Sixteenth ACM Symposium on Operating Systems Principles, No Month Listed 1997 (25 pages).
Tretau et al., "IBM TotalStorage NAS Backup and Recovery Solutions," IBM, Redbooks, Jul. 2002 (226 pages).
Veritas Software Corporation, "Veritas File System 4.1 Administrator's Guide," May 2005 (270 pages).
Veritas Software Corporation, "Veritas FlashSnap™ Point-in-Time Copy Solutions, Administrator's Guide 4.1," Apr. 2006 (102 pages).
Veritas Software Corporation, "Veritas NetBackup 4.5 Business Server™: Getting Started Guide," Mar. 2002 (91 pages).
Veritas Software Corporation, "Veritas NetBackup™ 4.5 for Informix: System Administrator's Guide," Mar. 2002 (94 pages).
Veritas Software Corporation, "Veritas NetBackup™ 4.5: User's Guide for UNIX," Mar. 2002 (212 pages).
VMware, "VMware Consolidated Backup: Best Practices and Deployment Considerations for SAN Environments," retrieved online at [URL:<<https://web.archive.org/web/20080804070141/http://www.vmware.com/files/pdf/vcb_best_practices>>] No Month Listed 2007 (39 pages).
Wolf, "VM Backup Bliss? The State of VM Data Protection in the Enterprise," Burton Group, Midvale, Utah, Aug. 1, 2007 (45 pages).
International Search Report and Written Opinion for International Patent Application No. PCT/US2016/013051 dated Apr. 19, 2016 (9 pages).

\* cited by examiner

DISK GROUP BASED BACKUP

CROSS REFERENCE TO RELATED APPLICATIONS

This application claims priority under 35 U.S.C. 119(e) to U.S. Provisional Application No. 62/102,393, entitled "Diskgroup Based Backup," filed on Jan. 12, 2015, the contents of which is incorporated by reference herein in its entirety.

TECHNICAL FIELD

This disclosure relates generally to copy data management techniques, and specifically to disk group based backup of databases.

BACKGROUND

Some traditional copy data services provide instant data availability for restore and read write access in certain situations. This instant data availability is realized by mount of filesystem-based backup to a database host. Although traditional protection methods enable instant data accessibility in certain situations, traditional methods are often inadequate, e.g., for the following scenarios: (1) an instant restore of a Very Large Database (VLDB) when a production database goes offline and when a database (e.g., an Oracle database) is protected Out-of-Band (OOB); and (2) provisioning of a clustered database (e.g., Oracle Real Application Clusters (RAC)) in a test and development environment for instant data availability using a production backup of the clustered database.

SUMMARY OF THE INVENTION

In some embodiments, the techniques described herein provide systems and methods of addressing instant restore of a VLDB when a production database goes offline and systems and methods of provisioning a clustered database in a Test & Dev environment using a production backup of a clustered database (also referred to herein as an Oracle RAC database or RAC database) for instant data availability. With the techniques described herein, backing up an out-of-band database can provide Automatic Storage Management (ASM) diskgroup based backup in incremental forever manner. In some embodiments, ASM diskgroup backup is resource efficient with increased throughput with configurable multi-node RAC backup. With the techniques described herein, including ASM diskgroup based backup, copy data storage systems (e.g., Actifio CDS) can provide instant restore of a production database when a disaster strikes by switching a production database to copy data storage where the database backup copy is managed. ASM diskgroup based backup lifecycle management can also provide data migration from copy data storage where the production database is running from after the disaster, back to production storage once it is repaired with zero or near zero downtime. In some embodiments, the systems and methods described herein also enables provisioning of one or more Test & Dev Oracle RAC instance in a near constant time regardless of the size of the database that is being provisioned.

In some embodiments, systems and methods are described herein for backing up clustered databases such that production backups associated with the clustered databases are restorable with near zero downtime. In some embodiments, the systems and methods described herein include transmitting, by a first computing device, first data indicative of a first backup request of a clustered database to a second computing device at a first point in time, the clustered database associated with an application, the clustered database including a plurality of nodes, each of the plurality of nodes including database data from a shared storage associated with the clustered database. In some embodiments, the systems and methods described herein include mapping, by the first computing device, first backup staging disks to each of the plurality of nodes. In some embodiments, the systems and methods described herein include adding, by the second computing device, the mapped first backup staging disks to a first backup staging diskgroup on a primary node of the plurality of nodes. In some embodiments, the systems and methods described herein include mounting, by the second computing device, the first backup staging diskgroup to each of the plurality of nodes. In some embodiments, the systems and methods described herein include executing, by the second computing device, one of a full backup from the primary node to the first backup staging diskgroup when load balancing is not configured, and a full backup from the primary node and at least one of the other plurality of nodes to the first backup staging diskgroup when load balancing is configured such that the full backup is representative of shared storage data at the first point in time. In some embodiments, the systems and methods described herein include transmitting, by the second computing device, a catalog of first backup information to a database associated with the first computing device. In some embodiments, the systems and methods described herein include creating, by the first computing device, a first snapshot of the first backup staging disk.

In some embodiments, the systems and methods described herein include transmitting, by the first computing device, second data indicative of a second backup request of the clustered database to a second computing device at a second point in time, and when a second backup request size of the application is larger than a first backup request size of the application, the second backup request size associated with the second backup request and the first backup request size associated with the first backup request: adding, by the first computing device, additional staging disks to the first backup staging disks to form second backup staging disks to account for an expansion of size associated with the application, mapping, by the first computing device, the second backup staging disks to each of the plurality of nodes; adding, by the second computing device, the additional staging disks to the first backup staging diskgroup to form a second backup staging diskgroup, mounting, by the second computing device, the second backup staging diskgroup to each of the plurality of nodes, executing, by the second computing device, incremental backup from each of the other plurality of nodes to the second backup staging diskgroup such that the incremental backup is representative of shared storage data at the second point in time, the incremental backup including backup of difference data, the difference data associated with changes to the application data between the first point in time and the second point in time, transmitting, by the second computing device, a catalog of second backup information to the database associated with the first computing device, and creating, by the first computing device, a second snapshot of the second backup staging disk.

In some embodiments, the systems and methods described herein include restoring the shared storage data when the shared storage is corrupted, wherein restoring the shared storage data comprises receiving, by the first computing device, third data associated with a request for restoring the shared storage data associated with at least one of the first snapshot and the second snapshot; mapping, by the first computing device, the requested snapshots to the plurality of nodes; mounting, by the second computing device, an associated staging diskgroup to the plurality of nodes; switching, by the second computing device, the clustered database to run from the associated staging diskgroup; and migrating, by the second computing device, associated staging diskgroup data to the shared storage using rebalancing after shared storage is repaired, wherein rebalancing includes spreading the staging diskgroup data evenly across all disks in a diskgroup associated with the repaired shared storage.

In some embodiments, the systems and methods described herein include provisioning the clustered database for test and development, wherein provisioning the clustered database for test and development comprises: receiving, by the first computing device, fourth data associated with a request for provisioning a portion of the clustered database for test and development, the request including a diskgroup name associated with the portion of the provisioned portion of the clustered database; receiving, by the first computing device, an IP address associated with a plurality of test and development nodes; mapping, by the first computing device, at least one snapshot associated with the requested portion of the clustered database to the plurality of test and development nodes; adding, by a third computing device, the mapped at least one snapshot to a test and development diskgroup associated with the plurality of test and development nodes; updating, by the third computing device, header information associated with disks in the test and development diskgroup with the diskgroup name; mounting, by the third computing device, the test and development diskgroup to each of the plurality of test and development nodes; and executing, by the third computing device, a clone operation from a primary node of the plurality of test and development nodes, wherein executing the clone operation includes creating new parameter files, setting new cluster database names, and communicating with other test and development nodes.

In some embodiments, the systems and methods described herein include enabling, by a database server, a listener associated with the provisioned clustered database such that the provisioned clustered database is active, the listener managing requests from a client to the clustered database.

These and other capabilities of the disclosed subject matter will be more fully understood after a review of the following figures, detailed description, and claims. It is to be understood that the phraseology and terminology employed herein are for the purpose of description and should not be regarded as limiting.

BRIEF DESCRIPTION OF FIGURES

Various objectives, features, and advantages of the disclosed subject matter can be more fully appreciated with reference to the following detailed description of the disclosed subject matter when considered in connection with the following drawings, in which like reference numerals identify like elements.

DETAILED DESCRIPTION

In the following description, numerous specific details are set forth regarding the systems and methods of the disclosed subject matter and the environment in which such systems and methods may operate, etc., in order to provide a thorough understanding of the disclosed subject matter. It will be apparent to one skilled in the art, however, that the disclosed subject matter may be practiced without such specific details, and that certain features, which are well known in the art, are not described in detail in order to avoid unnecessary complication of the disclosed subject matter. In addition, it will be understood that the embodiments provided below are exemplary, and that it is contemplated that there are other systems and methods that are within the scope of the disclosed subject matter.

In some examples, database OOB protection can be performed in a CDS using a native filesystem regardless of whether the source database is running from a filesystem or a disk group (also referred to herein as ASM diskgroup). When restoring an OOB protected instance, the CDS mounts a backup image, followed by RMAN (Recovery Manager) performing a catalog and restore. For a VLDB, restoring the whole database can take a long time, as RMAN physically moves data from a backup image to production storage. An alternative that can be used to minimize the downtime can be achieved by using a mount of a backup image from CDS, and followed by a clone process to standup a database. This methodology can bring an instance up quickly, but running in degraded mode, e.g. if source database is a RAC running from ASM, the cloned instance can only run as standalone instance, and from a filesystem (as backup image copies are stored on a filesystem). Traditionally, a backup destination is either filesystem or tape. Cloning of a source database also presents similar challenges in an RAC environment where test and development is also required to run the exact same deployment configuration as source.

In some embodiments, systems and methods described herein use an ASM diskgroup as a backup staging disk format, the CDS uses RMAN to backup database as image copy to the CDS staging disk; upon the completion of the backup, the CDS takes a snapshot of the staging disk to create a point in time copy of the backup. With an ASM diskgroup based backup, the CDS can restore a production database by using an RMAN switch to a managed database backup copy.

Figure 1:
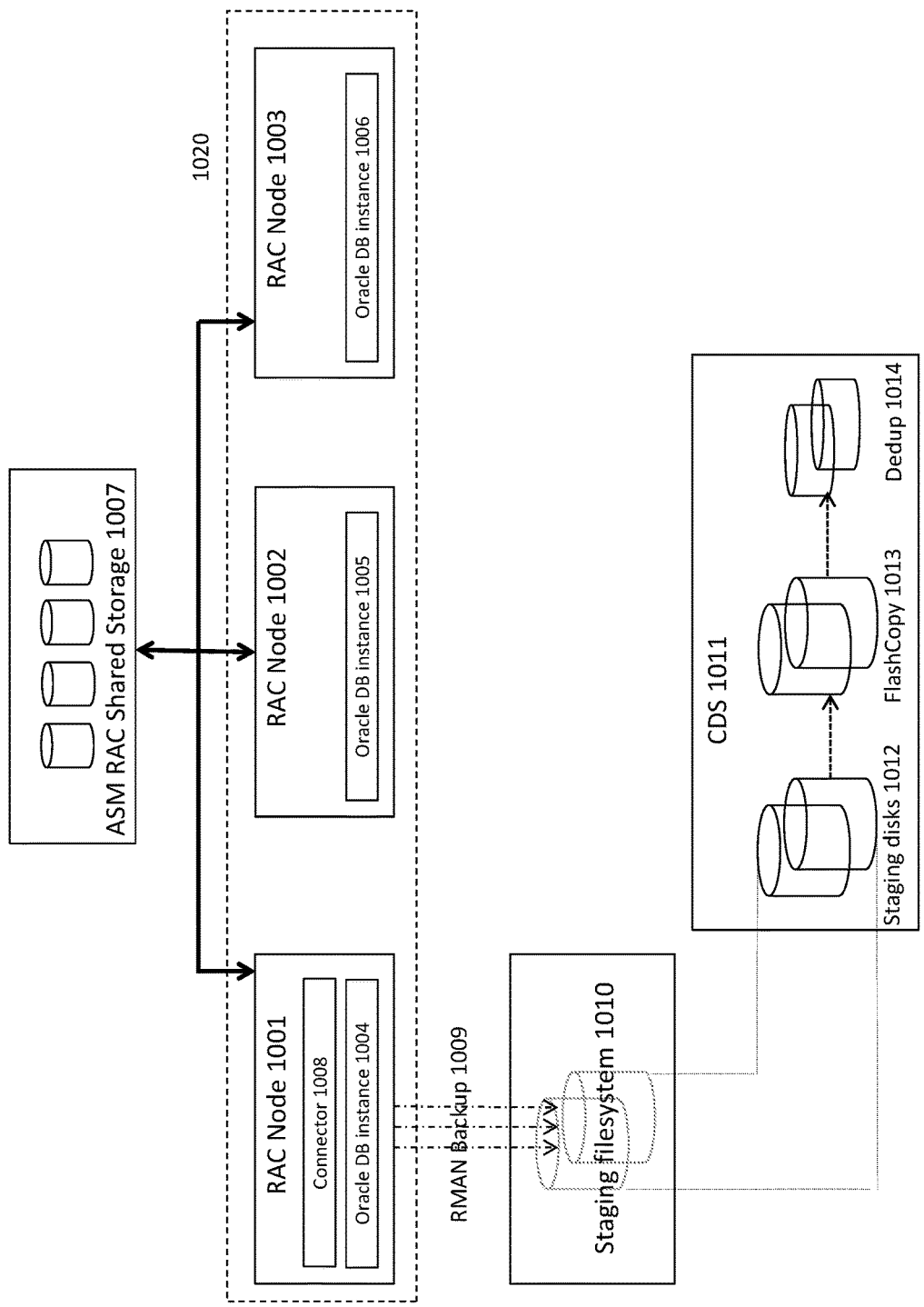
FIG. 1 is a system diagram showing an example of traditional out-of-band protection of a RAC database with a 3-node setup.

FIG. 1 is a system diagram showing an example of traditional out-of-band protection of a RAC database with 3-node setup. For illustration, FIG. 1 and some other examples described herein refer to Oracle-based systems, components and/or databases. However, such reference to Oracle-based systems is exemplary only, and it should be understood that any other database systems, components and databases can be used without departing from the spirit of the techniques described herein. Oracle RAC database 1020 includes RAC node 1001, RAC node 1002, and RAC node 1003. In some embodiments, a RAC node refers to a member host of Oracle Real Application Clusters, where there are one or more hosts making up the cluster. Oracle RAC instances 1004, 1005 and 1006 runs on their respective hosting nodes. A RAC instance refers to a database instance which is a member of the Oracle Real Application Clusters. Oracle RAC nodes 1001, 1002, and 1003, use ASM RAC shared storage 1007. Connector 1008 (e.g., Actifio Connector) is installed on RAC node 1001 and communicate with CDS 1011. Connector is a program running on each member node to facilitate communications between CDS and member node and to perform tasks (e.g., mapping disks onto a node) on the member node. Staging filesystem 1010 is created by connector 1008 for RMAN Backup 1009. RMAN backup 1009 refers generally to a backup process by a database client that performs backup, restore, and recovery of database files. CDS 1011 creates staging disks 1012 for Oracle RAC backup. Staging disks 1012 refer to disks made available to the filesystem 1010 for data backup. Staging disks 1012 are mapped to a single node (e.g., RAC node 1001) only. After RMAN Backup 1009 completes, CDS 1011 creates FlashCopy 1013 from staging disks 1012. FlashCopy 1013 refers generally to a point-in-time snapshot copy of a data set or volume. FlashCopy 1013 is further processed into Dedup storage 1014. Dedup storage 1014 refers generally to storage of deduplicated data.

CDS 1011 and Connector 1008 are responsible for backing up Oracle RAC database 1020, which resides on ASM RAC Shared Storage 1007 and is backed up onto the Staging filesystem 1010. CDS 1011 catalogs each of the backup details and corresponding FlashCopy 1013, which can be used for restore and Test & Dev operations at a user's discretion, as described in more detail in U.S. application Ser. No. 14/546,757, entitled "Test-and-Development Workflow Automation," filed Nov. 18, 2014, the contents of which are herein incorporated in their entirety.

Figure 2:
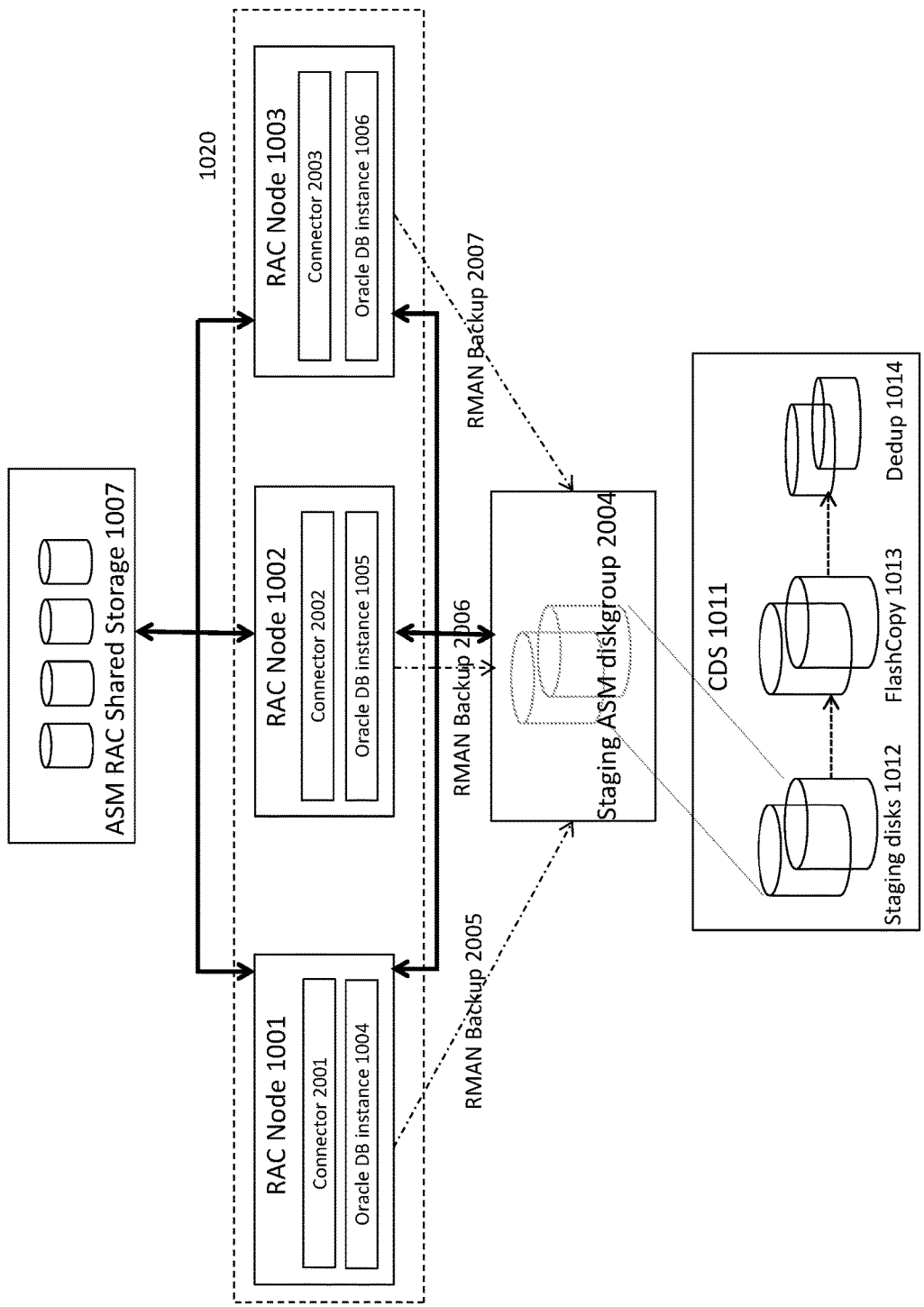
FIG. 2 is a system diagram showing a RAC backup method using an ASM diskgroup managed by a copy data storage system (CDS), according to some embodiments of the present disclosure.

FIG. 2 is a system diagram showing a RAC backup method using an ASM diskgroup managed by a copy data storage system (CDS), according to some embodiments of the present disclosure.

CDS 1011 and Oracle RAC database 1020 under protection is the same as those described in FIG. 1. CDS 1011 creates staging disks 1012 and maps them to all three RAC nodes 1001, 1002, and 1003. CDS 1011 initiates backup requests to Connector 2001. Connector 2001 adds the mapped staging disks to staging ASM diskgroup 2004 and mounts the staging diskgroup 2004 to a database instance 1004 1005 1006 on the RAC nodes 1001 1002 1003. A backup stream can be configured from multiple RAC nodes as staging ASM diskgroup 2004 is mounted on all RAC nodes. For example, a backup stream can contain data from any one of the DB instances 1004 1005 1006. As discussed above, each of the DB instances 1004 1005 1006 are instances of portions of data within ASM RAC shared storage 1007. Connector 2001 controls the RMAN backup 2005, as well as RMAN backup 2006 and 2007. Connector 2002 and 2003 process mapped disks on RAC node 1002 and 1003 when multiple nodes are configured to participating in the backup. Once the RMAN backup completes for Oracle RAC, Connector 2001 sends a message with backup details to CDS 1011. CDS 1011 then creates a FlashCopy 1013 and updates its management database on CDS 1011 for this backup. A management database is a persistent datastore on CDS 1011 where all backup information is stored. FlashCopy 1013 is further processed into Dedup storage 1014. Dedup storage 1014 refers generally to storage of deduplicated data.

Figure 3:
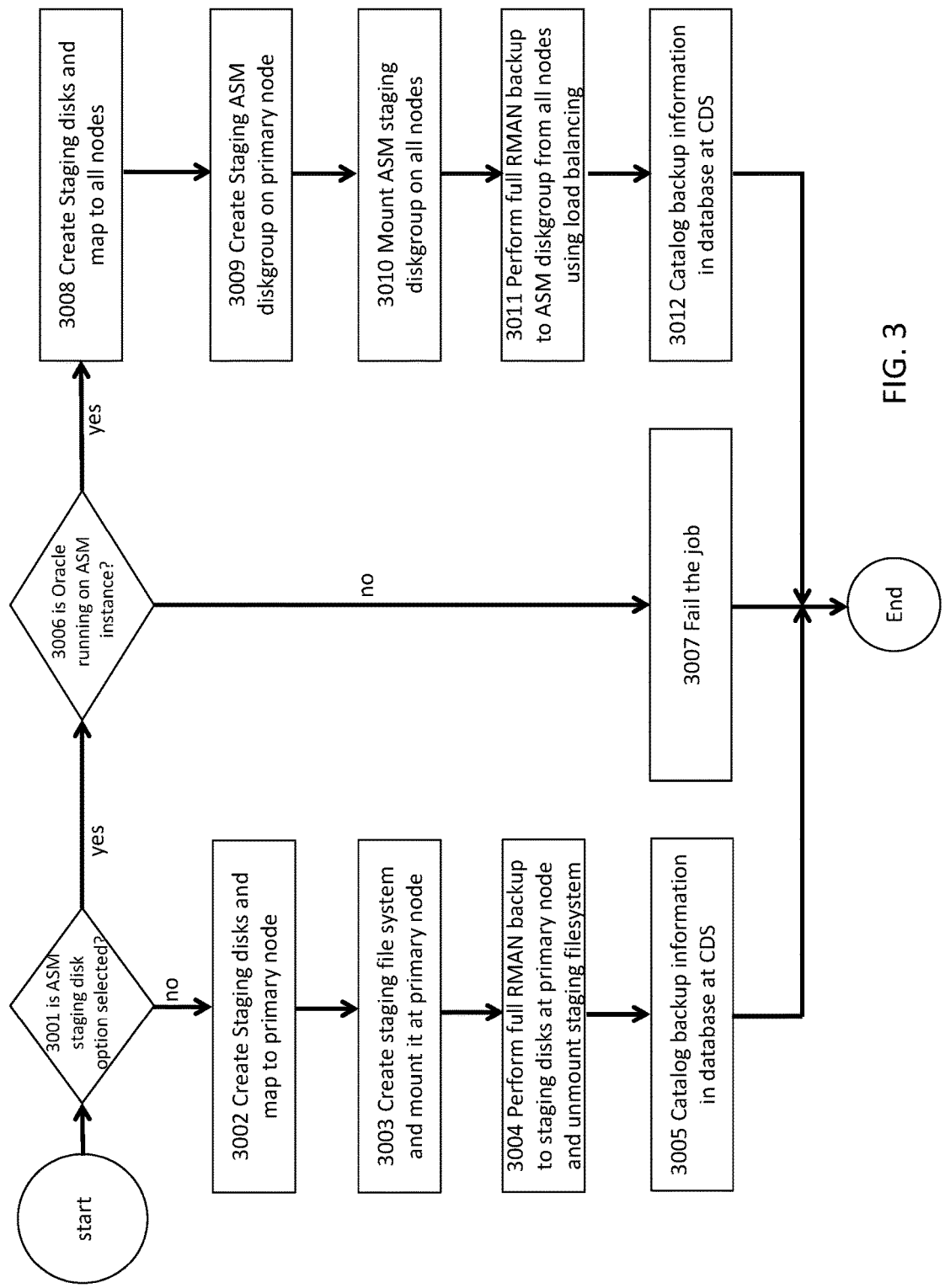
FIG. 3 is a flowchart for a first full backup of a RAC database managed by a CDS using ASM staging diskgroup as an option, according to some embodiments of the present disclosure.

FIG. 3 is a flowchart for a first full backup of a RAC database managed by a CDS using ASM staging diskgroup as an option, according to some embodiments of the present disclosure.

In some embodiments, a CDS user interface can provide an ASM Diskgroup 2004 as a staging disk option for an Oracle backup configuration. A user can select to use an ASM Diskgroup 2004 as a staging disk for an Oracle database backup. At step 3001, CDS 1011 checks whether ASM diskgroup 2004 is selected as a staging disk option. When this option is not selected, the backup moves to Step 3002, where CDS 1011 creates staging disks and maps them to the primary backup RAC node 1001. Referring to step 3003, Connector 1008 creates a staging filesystem 1010 and mounts it on the primary backup RAC node 1001. Referring to step 3004, Connector 1008 performs a full Oracle database backup using RMAN image copy 1009. Connector 1008 unmounts the staging filesystem at the conclusion of the RMAN backup 1009 and sends a message to CDS 1011. Referring to step 3005, CDS 1011 catalogs backup information of the Oracle RAC database in its management database.

Referring to step 3001, when using ASM diskgroup as staging option is selected, CDS 1011, at step 3006 checks whether an Oracle database is running on ASM. If it is not, CDS 1011 fails the backup in Step 3007. When Oracle database running on ASM diskgroup 2004 is verified at step 3008, CDS 1011 creates staging disks and maps them to all RAC nodes 1001 1002 1003. Referring to step 3009, Connector 2001 creates staging ASM diskgroup 2004 on the primary backup node 1001 with all staging disks mapped from step 3008. Referring to step 3010, Connectors 2001 2002 2003 mount ASM staging diskgroup 2004 on all Oracle RAC nodes 1001 1002 1003. Referring to step 3011, Connector 2001 performs a full backup from the primary backup RAC node 1001. RMAN backup 2005 2006 2007 can be running on multiple RAC nodes using load balancing when load balancing is configured. Load balancing for backup is multiple-nodes sharing the backup loads when there are more than one node is configured for the backup activity. At the conclusion of the RMAN backup, Connector 2001 sends a message to CDS to indicate either a successful backup or failure. Connector 2001 is the primary facilitator between CDS and Oracle RMAN to conduct the backup.

Connector 2002 and 2003 are responsible to prepare mapped staging disks on RAC node 1002 and 1003 so that staging diskgroup will be available on all 3 RAC nodes when Connector 2001 creates and mounts the staging diskgroup. This can be performed when load balancing for the backup becomes available and is managed by the manager of the database (e.g., an Oracle database manager). Referring to step 3012, CDS 1011 catalogs the backup information of the Oracle RAC database in CDS management database.

Figure 4:
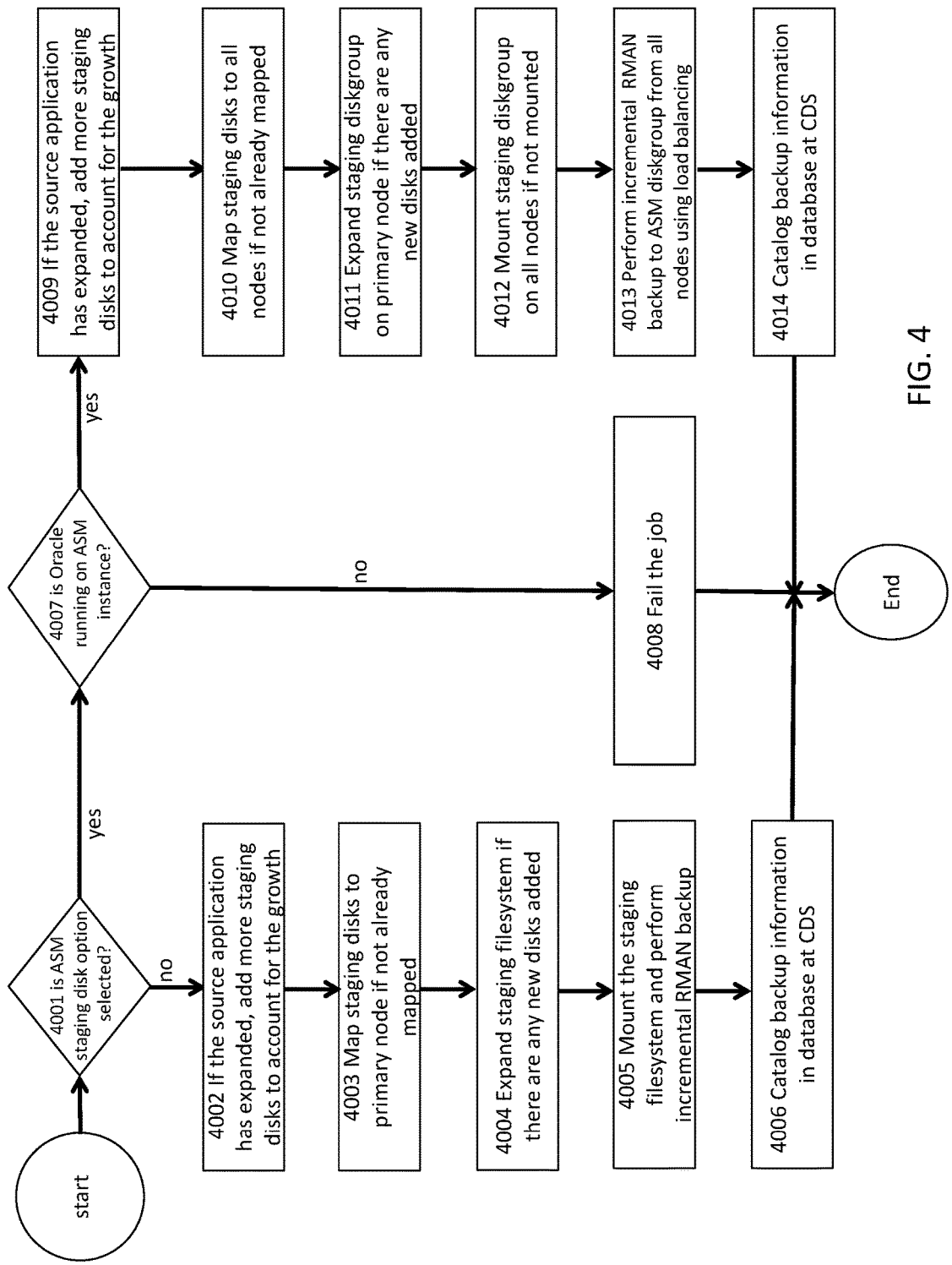
FIG. 4 is a flowchart for incremental backup of a RAC database managed by a CDS, according to some embodiments of the present disclosure.

FIG. 4 is a flowchart for incremental backup of a RAC database managed by a CDS, according to some embodiments of the present disclosure.

Referring to step 4001, CDS 1011 checks whether ASM diskgroup 2004 is selected as a staging disk option. If this option is not selected, at step 4002, CDS 1011 checks whether source Oracle RAC database 1020 has expanded its size, and adds more staging disks if database size increases. At step 4003, CDS 1011 maps staging disks to primary RAC backup node 1001 if these disks are not already mapped. Step 4004, Connector 1008 expands staging filesystem if there are new staging disks added due to source Oracle RAC database size increase. Step 4005, Actifio Connector mounts the staging filesystem and performs an incremental RMAN backup. At the conclusion of the backup, Actifio Connector sends message with backup details to Actifio CDS to complete the backup. Step 4006, Actifio CDS catalogs the backup information in CDS management database.

When CDS 1011 detects using ASM diskgroup as a staging disk option is selected at step 4001, CDS 1011 checks whether protected Oracle database 1020 is running on an ASM instance at step 4007. Referring to step 4008, CDS 1011 fails the backup if the Oracle database is not running on ASM. Referring to step 4009, CDS 1011 adds more staging disks if source Oracle RAC database 1020 has grown in size. This procedure can ensure that the backup will be incremental even when the source database grows in size. Referring to step 4010, CDS 1011 maps staging disks to all Oracle RAC nodes 1001 1002 1003 if not already mapped. Referring to step 4011, Connector 2001 adds any new staging disks to backup staging ASM diskgroup on primary RAC backup node 1001. Referring to step 4012, Connector 2001 mounts staging ASM diskgroup on all Oracle RAC nodes 1001 1002 1003 after Connector 2002 and 2003 prepares mapped staging disks on RAC nodes 1002 and 1003 if they are not already mounted. Referring to step 4013, Connector 2001 starts RMAN incremental backup 2005 2006 2007 from all backup RAC nodes using load balancing if the feature is configured. Connector 2001 sends message with backup information to CDS 1011 at the conclusion of the backup. Referring to step 4014, CDS 1011 catalogs backup information in CDS management database.

Figure 5:
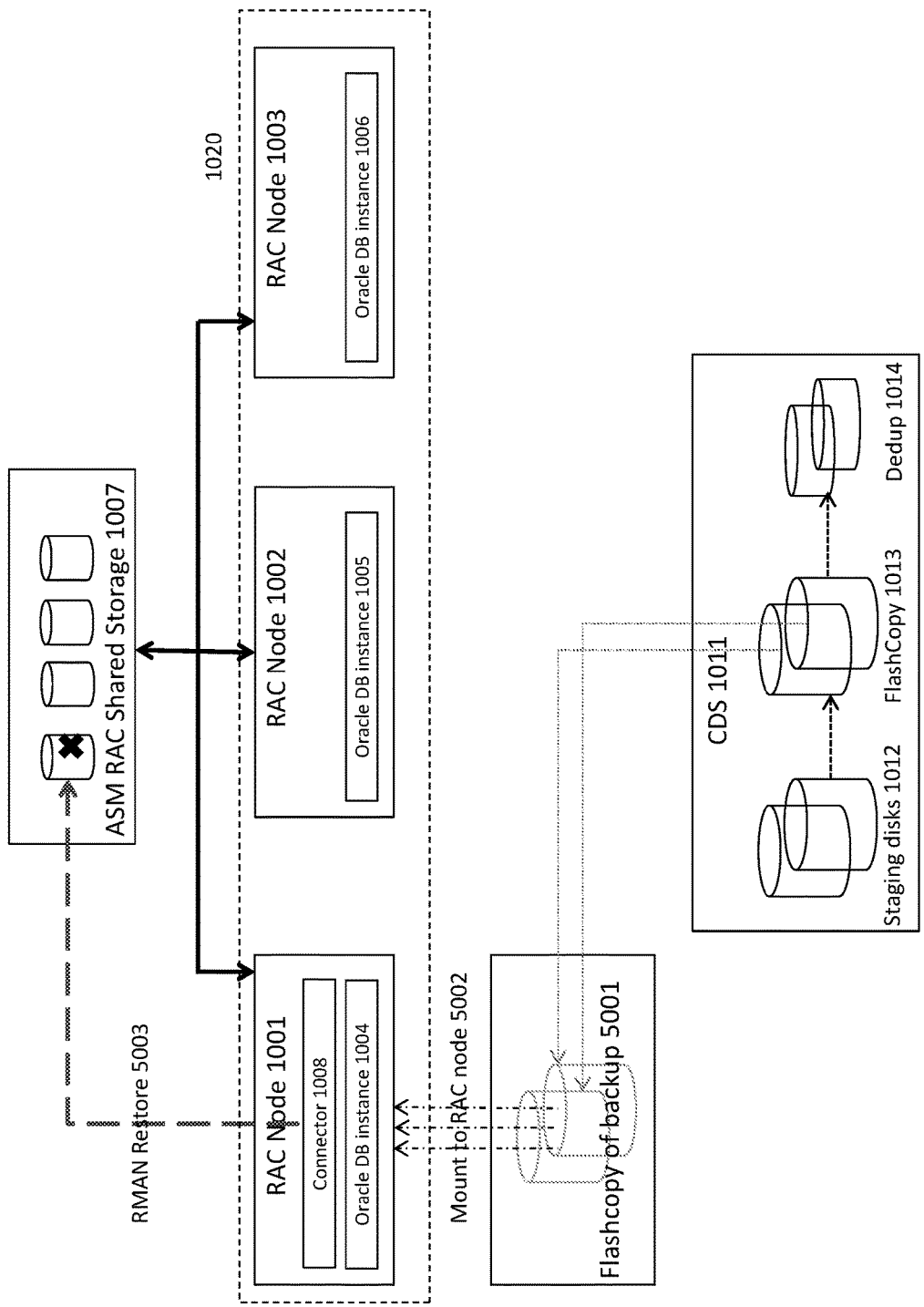
FIG. 5 is a system diagram showing traditional methods of restore of a RAC database from backup.

FIG. 5 is a system diagram showing traditional methods of restore of a RAC database from backup.

When Oracle RAC database 1020 encounters a storage array issue, for example one of the ASM disks becomes corrupt in ASM RAC Shared Storage 1007, a user can use CDS 1011 to select a restore point from FlashCopy 1013. CDS 1011 creates a FlashCopy of this backup 5001, and maps the disks to RAC node 1001. Connector 1008 mounts the filesystem from the mapped backup disks 5002. Once backup is mounted, RMAN Restore 5003 can use it to restore database, tablespace(s), or datafile(s) to ASM RAC Shared storage 1007. Although CDS 1011 can mount the backup image instantly, this process involves database downtime to allow the RMAN Restore 5003 to complete.

Figure 6:
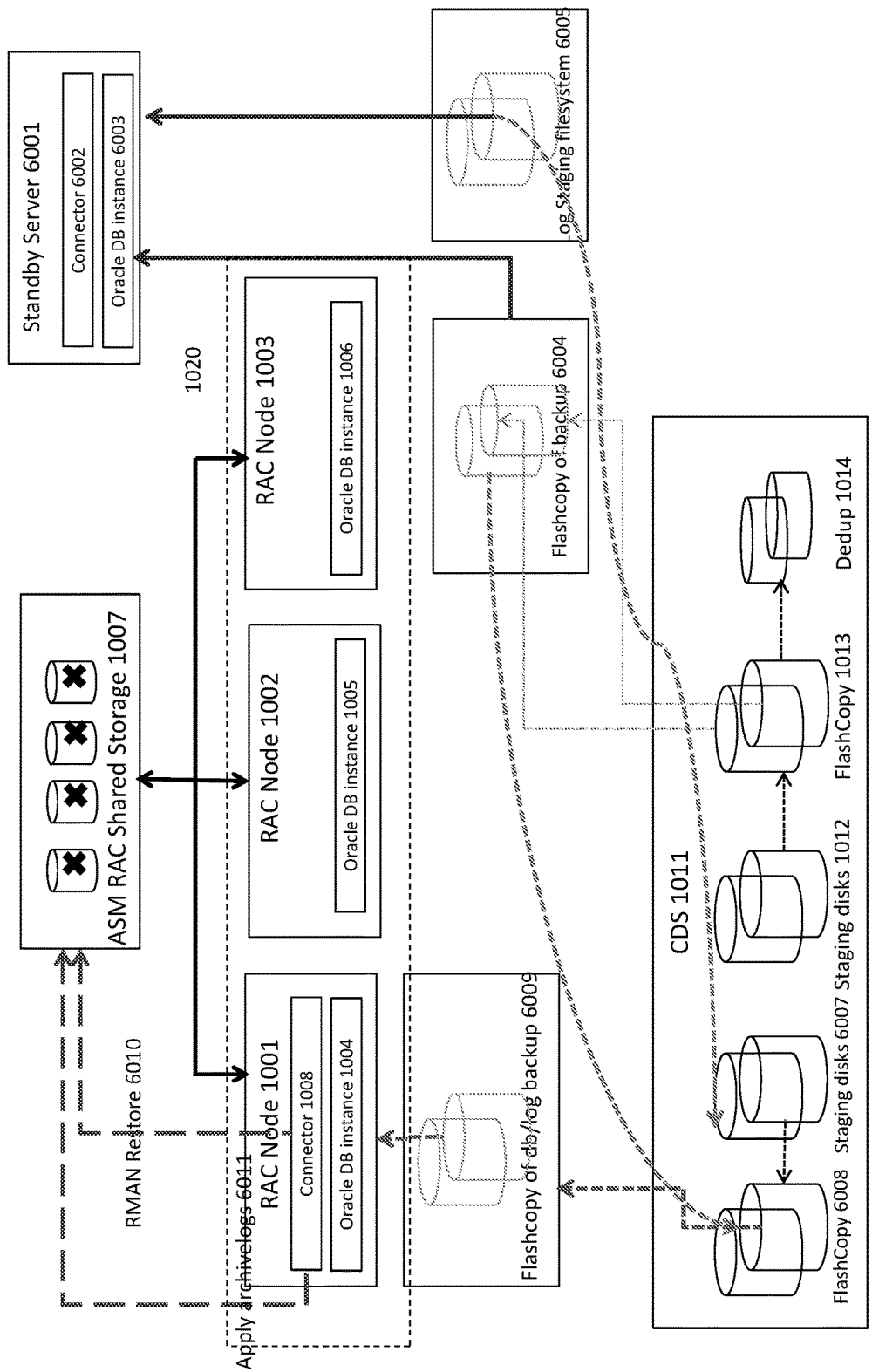
FIG. 6 is a system diagram illustrating a traditional method of restore of a RAC database with minimum database downtime, but with increased operational complexity.

FIG. 6 is a system diagram illustrating a traditional method of restore of a RAC database with minimum database downtime, but with increased operational complexity. This method requires a standby server 6001, and multiple phases for restore and data migration back to production storage.

When Oracle RAC database encounters a storage array issue, it can lead to failure of a production diskgroup(s). To minimize the database downtime, a user selects a restore point from backup image from CDS 1011, and uses Flash-Copy 1013 to create a FlashCopy of backup 6004. CDS 1011 maps disks from FlashCopy of backup 6004 to the standby Server 6001. Connector 6002 mounts the backup filesystem to Standby Server 6001. Connector 6002 starts a clone operation to clone Oracle DB instance 6003. Once clone operation completes, Oracle DB instance 6003 receives connections from application layer and serving requests, and consequently, database service is restored.

In order to migrate new transactional data received by newly cloned database back to production storage, Oracle DB instance 6003 is protected by CDS 1011. Both DB Staging filesystem 6004 and Log Staging filesystem 6005 are protected in band. Oracle DB instance 6003 will be protected by CDS in shorter intervals for both database datafiles 6004 and its archivelogs 6005.

Once ASM RAC Shared Storage 1007 is repaired, datafiles from Oracle DB instance 6003 can be restored back to production ASM RAC Shared Storage 1007. CDS 1011 creates Flashcopy of backup FlashCopy 6008 and maps disks to RAC Node 1001. Connector 1008 mounts the backup filesystem 6005 to RAC Node 1001. RMAN Restore 6010 restores database first and leaves the database in a mounted state. Connector 1008 mounts archivelog filesystem to RAC Node 1001 to allow RMAN to apply archivelogs 6011. Connector 1008 repeats the application of archivelogs after a new archivelog backup becomes available from the cloned Oracle DB instance 6003 of Standby Server 6001. Connector 1008 then schedules a maintenance window for downtime, shuts down cloned Oracle DB instance 6003, and takes the last archivelog backup and applies the last backup to Oracle DB Instance 1004 on RAC Node 1001. The Oracle RAC database with all data migrated from cloned Oracle DB instance 6003 can now be opened.

Figure 7:
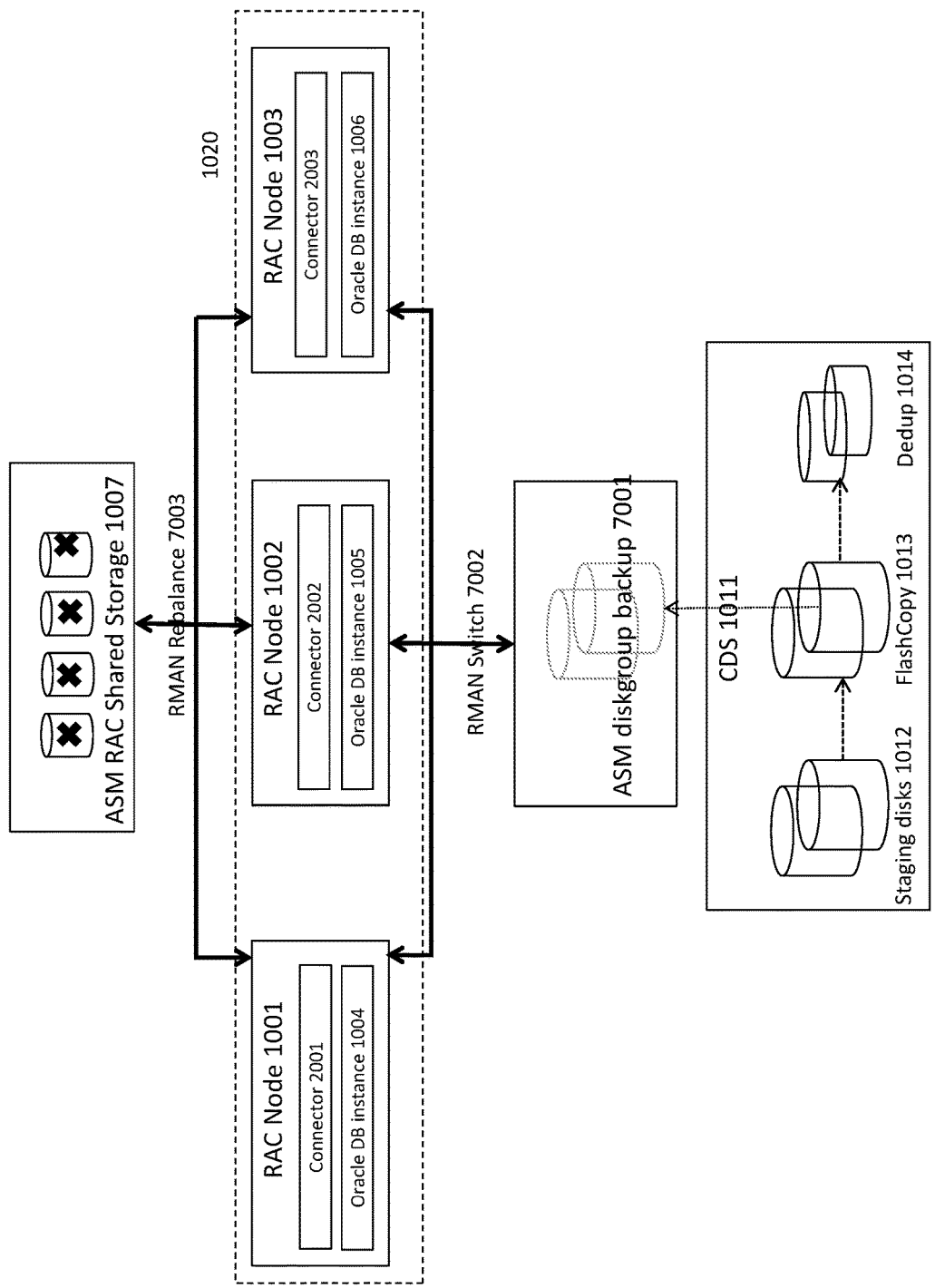
FIG. 7 is a system diagram illustrating a restore method with an ASM staging disk based backup with instant restore and no downtime data migration, according to some embodiments of the present disclosure.

FIG. 7 is a system diagram illustrating a restore method with an ASM staging disk based backup with instant restore and no downtime data migration, according to some embodiments of the present disclosure.

Once ASM RAC Shared Storage 1007 encounters storage issues and Oracle RAC database is down, CDS 1011 creates FlashCopy from backup FlashCopy 1013. CDS 1011 maps disks to RAC Nodes 1001, 1002, 1003. Connector 2001 mounts ASM backup diskgroup 7001 to RAC node 1001. Connector 1001 issues RMAN switch 7002 and Oracle RAC database 1020 is running from ASM backup diskgroup 7001. All new writes can go to ASM backup diskgroup 7001. After ASM RAC Shared Storage 1007 is repaired, RMAN Rebalance 7003 can migrate data from ASM backup disks 7001 to ASM RAC Shared Storage 1007. User can remove ASM diskgroup disks 7001 after rebalance completes and all data is migrated onto ASM RAC Shared Storage 1007. In some embodiments, ASM attempts to spread the data evenly across all disks in a diskgroup. When a disk is added or removed from a diskgroup, ASM can re-spread all data files across the new disk layout, which is referred to herein as rebalance.

Figure 8:
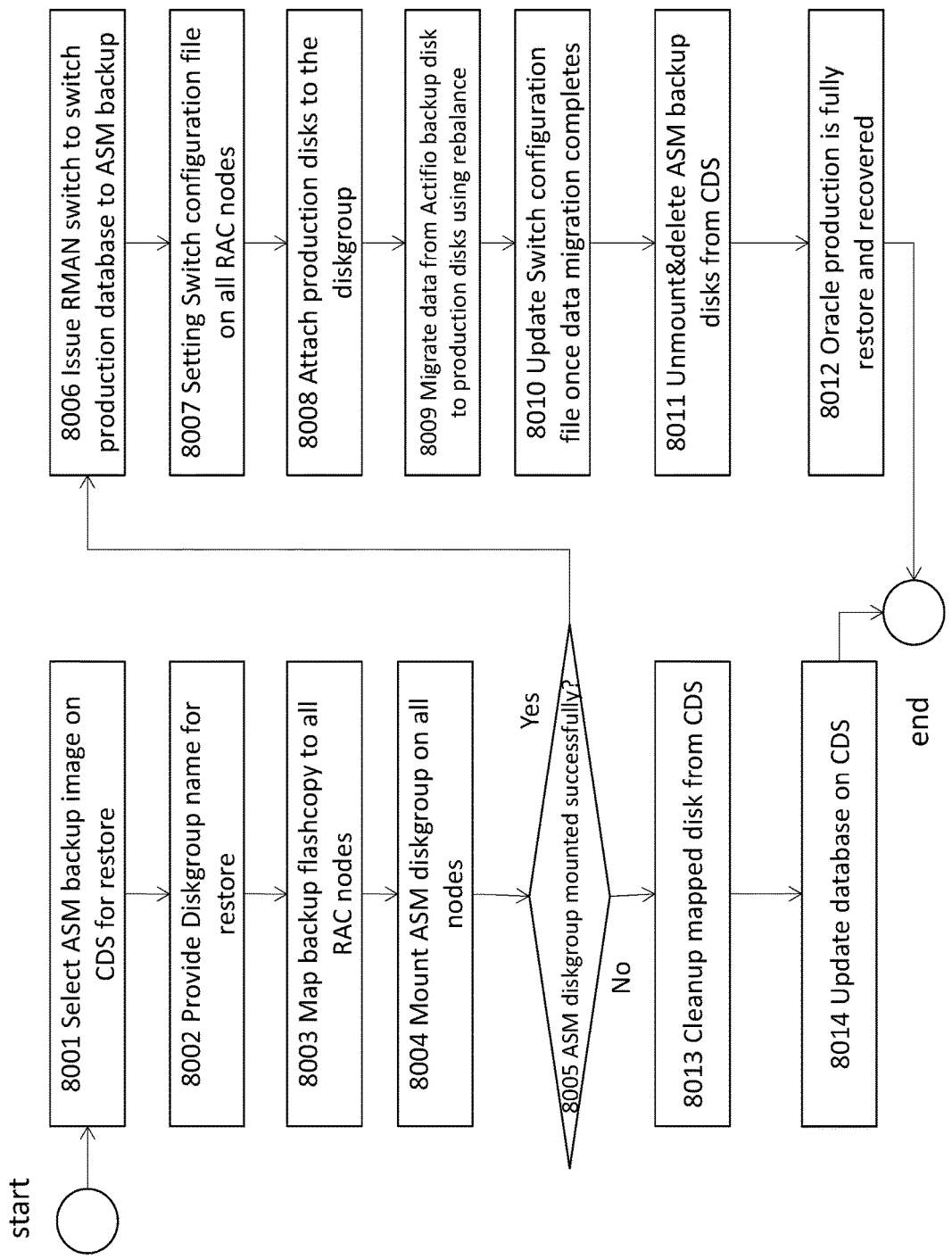
FIG. 8 is a flowchart showing the restoration of a RAC database using ASM backup, according to some embodiments of the present disclosure.

FIG. 8 is a flowchart showing the restoration of a RAC database using ASM backup, according to some embodiments of the present disclosure.

At step 8001, a user selects an ASM backup image on CDS 1011 for restore. At step 8002 CDS 1011 prompts user for a preferred Diskgroup name to be used for restore. At step 8003 CDS maps ASM backup flashcopy disks to all RAC nodes 1001 1002 1003. At step 8004 Connector 2001 mounts ASM diskgroup on all RAC nodes 1001 1002 1003. If mounting diskgroup fails 8005, at step 8013, Connector 2001 unmaps ASM flashcopy from RAC nodes 1001 1002 1003. At step 8014, CDS 1011 updates the management database.

If mount ASM diskgroup is successful 8005, Connector 2001, at step 8006, issues RMAN Switch to switch production database to ASM diskgroup mounted by CDS 1011. A lock file for managing RMAN lifecycle is created on all RAC nodes 8007. The lock file is a file with attributes denoting the database name in the switch process and status of the switch process. Once the Oracle ASM production storage issue is resolved, the production disks are repaired at step 8008 by adding production disks to a restore diskgroup. At step 8009, data migration is started from ASM backup disks to production disks using rebalance and ASM backup disks are dropped from the restore diskgroup. In some embodiments, dropping a disk from a diskgroup refers to removing a disk from the diskgroup. In some embodiments, the removal of the disk does not take place until after rebalancing is complete. At step 8010 rebalance status is updated in lock file on all nodes to allow cleanup of ASM disks. At step 8011, users can unmount and delete ASM backup disks from all RAC nodes and from CDS. At step 8012, Oracle RAC database is fully restored back to production storage.

Figure 9:
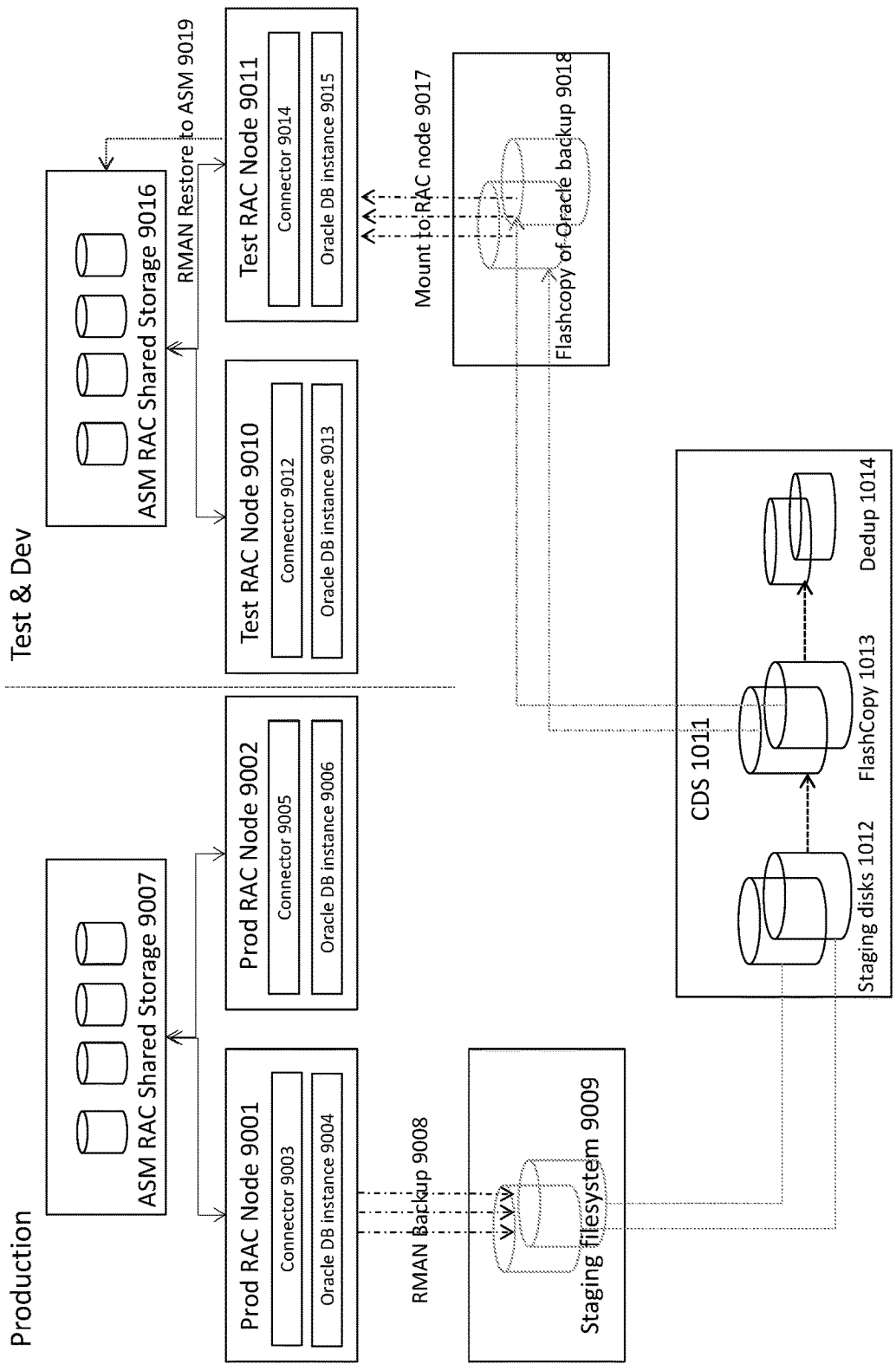
FIG. 9 is a system diagram showing a provisioning of a test and development RAC database (2-node) from backup.

FIG. 9 is a system diagram showing a provisioning of a test and development RAC database (2-node) from backup. When Test & Development requires Oracle RAC setup, the existing method is to use RMAN restore to an ASM diskgroup, which takes up the same amount of storage footprint as in production and can be expected to take time linearly proportional to the production backup size.

CDS 1011 backs up Production RAC database Node 9001 9002 onto Staging filesystem 9009, backup images created as FlashCopy 1013. When a Test & Development provision requests comes, CDS 1011 creates Flashcopy of Oracle backup 9018 from FlashCopy 1013. The disks from Flashcopy of Oracle backup 9018 are mapped to Test RAC Node 9011. Connector 9014 mounts the backup filesystem to Test RAC Node 9011. RMAN Restore to ASM diskgroup 9019 restores Oracle backup to ASM RAC Shared Storage 9016. Test Oracle DB Instance 9015 can be opened for READ and WRITE for testing.

Figure 10:
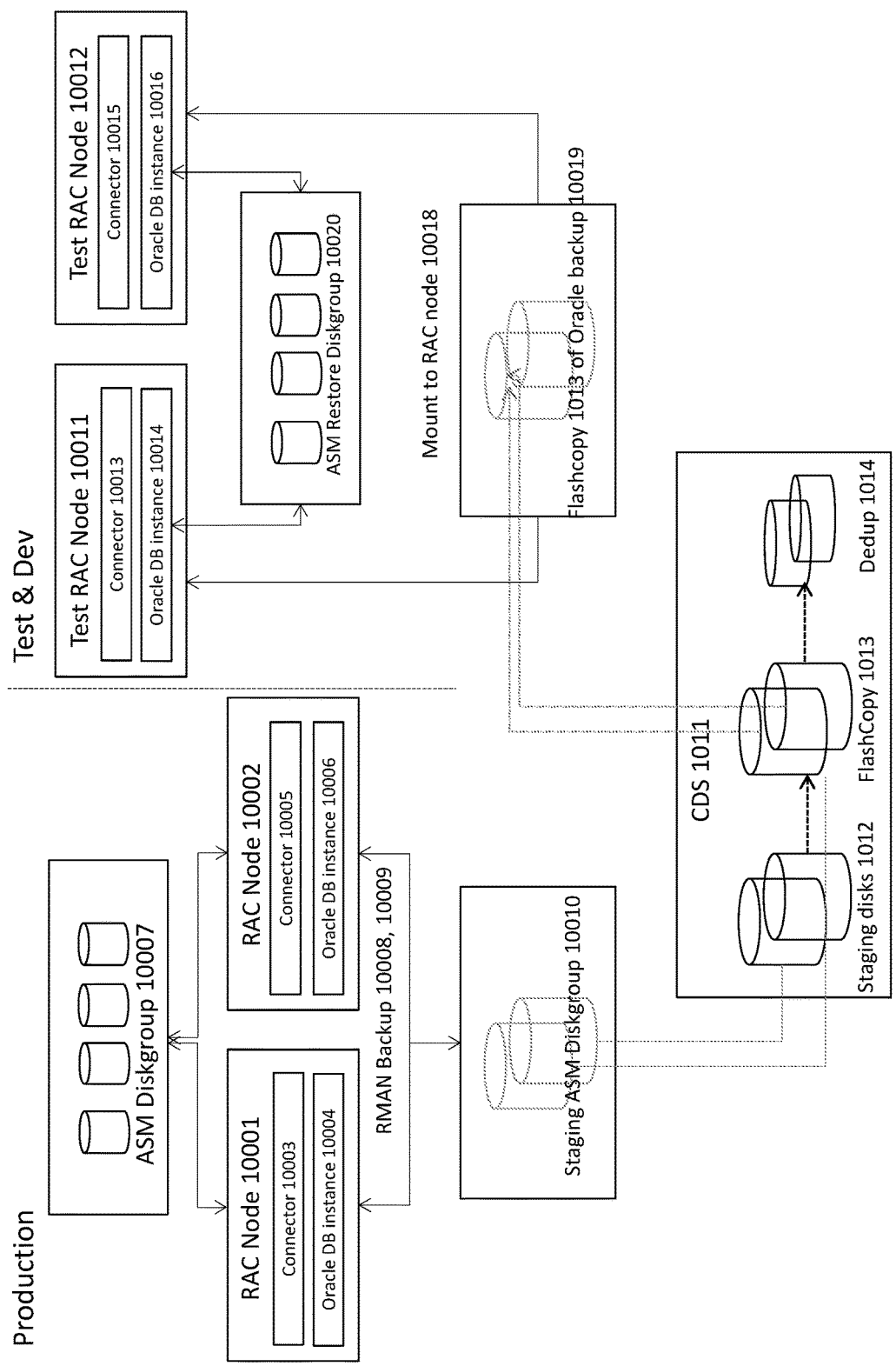
FIG. 10 is a system diagram showing a provisioning of a test and development RAC database (2-node) from an ASM backup, according to some embodiments of the present disclosure.

FIG. 10 is a system diagram showing a provisioning of a test and development RAC database (2-node) from an ASM backup, according to some embodiments of the present disclosure. The systems and methods described herein can provision a multi-node RAC that requires a near zero storage footprint and take near constant time regardless of the size of the production backup.

CDS 1011 backs up Oracle RAC database from RAC Node 10001 and 10002 using ASM diskgroup as the staging disk. To provision a 2-node RAC database in Test & Dev, CDS creates disks 10019 from FlashCopy 1013 and maps them to Test RAC Node 10011 and Test RAC Node 10012. Connector 10013 adds mapped ASM backup disks 10019 to an ASM restore diskgroup 10020 and mounts the diskgroup to ASM instance (not shown) running on Test RAC node 10011 and 10012. In some embodiments, an ASM instance is required to run on all RAC nodes in order for the RAC to function. In some embodiments, an ASM instance is a small and lightweight database instance that manages disks in a disk group and controls administrative tasks for the disk group (e.g., an Oracle instance that manages the disks in the ASM diskgroups and administrative works related to ASM). Connector 10013 starts clone operation using ASM Restore diskgroup 10020. Once the clone operation completes, an Oracle RAC database with 2 instances Oracle DB instance 10014 on Test RAC Node 10011 and Oracle DB instance 10016 on Test RAC Node 10012 opens in READ/WRITE mode. As there is no data movement in this managed Oracle RAC clone process, the time required to finish the clone is near constant and storage footprint is near zero.

Figure 11:
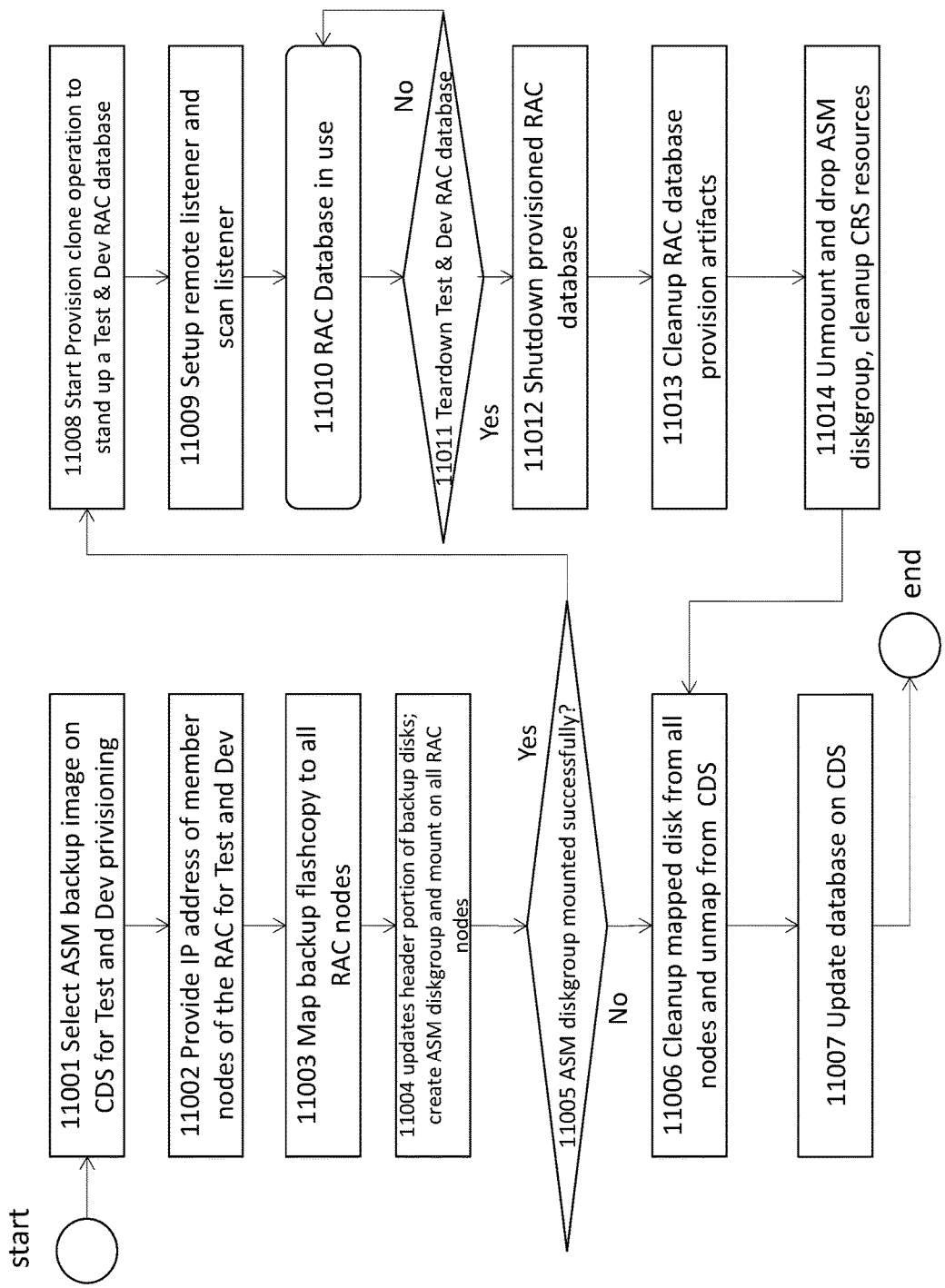
FIG. 11 is a flowchart showing a process of provisioning a test and development RAC database using ASM diskgroup based backup, according to some embodiments of the present disclosure.

FIG. 11 is a flowchart showing a process of provisioning a test and development RAC database using ASM diskgroup based backup, according to some embodiments of the present disclosure.

At step 11001, a user selects an ASM backup image on CDS for Test and Dev instance provisioning. At step 11002, a CDS user interface provides an option for a user to enter IP addresses of member nodes where RAC instances will be running from.

At step 11003, CDS maps disks off backup flashcopy to all RAC member nodes.

Step 11004, Connector updates header of backup ASM disks with new diskgroup name, creates the new diskgroup with modified backup ASM disks and mounts the diskgroup on all RAC member nodes.

Step 11005, CDS checks the mount status of the new ASM diskgroup. If mount fails, at step 11006, mapped disks from all nodes are cleaned up and unmapped from CDS. At step 11007, CDS updates management database.

If mount is successful in step 11005, at step 11008, Connector starts provision clone operation from primary RAC node, creating new parameter files, set new RAC database name, communicate with other member node(s) for RAC database clone. The communication with other member nodes includes setting up parameter file for RAC instance and required directory structures. At step 11009, Connector setups remote listener and scan listener, and open RAC database. The listener is a separate process that runs on the database server. It receives incoming client connection requests and manages the traffic of these requests to the database. At step 11010, Test & Dev RAC database is in use, serving requests from the application layer. At step 11011, user can use Test & Dev lifecycle management, which is provided by CDS, and check whether it is time to tear down the RAC database. CDS Test & Dev lifecycle management allows creation of a database instance for Test & Dev use and teardown the database and cleanup all its resources. At step 11012, Connector tears down the Test & Dev database by shutting down a provisioned RAC database. At step 11013, Connector cleanups artifacts generated as a result of provisioned RAC database. At step 11014, Connector unmounts and drops ASM diskgroup, cleanup CRS (Oracle Cluster Ready Services) resource. At step 11006, CDS cleanups mapped ASM disks from all nodes and unmaps from CDS. At step 11007, CDS updates management database.

In some examples described herein, the techniques are described with respect to Oracle databases and systems. These examples are intended to be exemplary only and not limiting. The techniques described herein can be implemented with other types of storage methods and systems, as can be appreciated by one of skill in the art. For example, the systems and methods described herein can also apply to other databases and systems with similar functionality as ASM. ASM (Automatic Storage Management) is a management tool designed by Oracle specifically for Oracle database storage management. ASM provides a consistent storage management interface across all server and storage platforms. ASM also provides a clustered filesystem for RAC databases and a consistent clusterwide namespace for database files. ASM simplifies administration of Oracle related files by managing a group of disks rather than individual disks and files. The main components of ASM are disk groups, each of which comprise of several physical disks that are controlled as a single unit. The physical disks are known as ASM disks; while the files that reside on the disks are know as ASM files. The locations and names for the files are controlled by ASM, but user-friendly aliases and directory structures can be defined for ease of reference.

In some examples described herein, the techniques are described with respect to systems provided by Actifio. These examples are intended to be exemplary only and not limiting. The systems and methods described herein can utilize any other type of system, as can be understood by a person of skill in the art. For example, Actifio CDS, as used herein, can be protecting a production database with this technique, and provide instant restore capability for the protected database. Actifio CDS, when using this technique, can also provides instant provisioning capability for test & dev equivalent of production database setup. Actifio CDS keeps point-in-time flashcopy backup images which can be used to restore or provision test & dev instances. The metadata of flashcopy backup image is maintained in a management database that is updated after each backup. Actifio CDS manages life cycle of backup of databases and test & dev copies originated from the backups.

The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processor of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of nonvolatile memory, including by way of example semiconductor memory devices, (e.g., EPROM, EEPROM, and flash memory devices); magnetic disks, (e.g., internal hard disks or removable disks); magneto optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The subject matter described herein can be implemented in a computing system that includes a back end component (e.g., a data server), a middleware component (e.g., an application server), or a front end component (e.g., a client computer having a graphical user interface or a web browser through which a user can interact with an implementation of the subject matter described herein), or any combination of such back end, middleware, and front end components. The components of the system can be interconnected by any form or medium of digital data communication, e.g., a communication network. Examples of communication networks include a local area network ("LAN") and a wide area network ("WAN"), e.g., the Internet.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods, and systems for carrying out the several purposes of the disclosed subject matter. It is important, therefore, that the claims be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter, which is limited only by the claims which follow.

The invention claimed is:

1. A computerized method of backing up clustered databases such that production backups associated with the clustered databases are restorable with near zero downtime, the method comprising:
   transmitting, by a first computing device, first data indicative of a first backup request of a clustered database to a second computing device at a first point in time, the clustered database associated with an application, the clustered database including a plurality of nodes, each of the plurality of nodes including database data from a shared storage associated with the clustered database;
   mapping, by the first computing device, first backup staging disks to each of the plurality of nodes;
   adding, by the second computing device, the mapped first backup staging disks to a first backup staging diskgroup on a primary node of the plurality of nodes;
   mounting, by the second computing device, the first backup staging diskgroup to each of the plurality of nodes;
   executing, by the second computing device, one of:
      a full backup from the primary node to the first backup staging diskgroup when load balancing is not configured, and
      a full backup from the primary node and at least one of the other plurality of nodes to the first backup staging diskgroup when load balancing is configured such that the full backup is representative of shared storage data at the first point in time;
   transmitting, by the second computing device, a catalog of first backup information to a database associated with the first computing device; and
   creating, by the first computing device, a first snapshot of the first backup staging disk,
   thereby backing up clustered databases such that production backups associated with the clustered databases are restorable with near zero downtime.

2. The computerized method of claim 1, further comprising:
   transmitting, by the first computing device, second data indicative of a second backup request of the clustered database to a second computing device at a second point in time; and
   when a second backup request size of the application is larger than a first backup request size of the application, the second backup request size associated with the second backup request and the first backup request size associated with the first backup request:
      adding, by the first computing device, additional staging disks to the first backup staging disks to form second backup staging disks to account for an expansion of size associated with the application,
      mapping, by the first computing device, the second backup staging disks to each of the plurality of nodes,
      adding, by the second computing device, the additional staging disks to the first backup staging diskgroup to form a second backup staging diskgroup,
      mounting, by the second computing device, the second backup staging diskgroup to each of the plurality of nodes,
      executing, by the second computing device, incremental backup from each of the other plurality of nodes to the second backup staging diskgroup such that the incremental backup is representative of shared storage data at the second point in time, the incremental backup including backup of difference data, the difference data associated with changes to the application data between the first point in time and the second point in time,
      transmitting, by the second computing device, a catalog of second backup information to the database associated with the first computing device, and
      creating, by the first computing device, a second snapshot of the second backup staging disk.

3. The computerized method of claim 2, further comprising restoring the shared storage data when the shared storage is corrupted, wherein restoring the shared storage data comprises:
   receiving, by the first computing device, third data associated with a request for restoring the shared storage data associated with at least one of the first snapshot and the second snapshot;
   mapping, by the first computing device, the requested snapshots to the plurality of nodes;
   mounting, by the second computing device, an associated staging diskgroup to the plurality of nodes;
   switching, by the second computing device, the clustered database to run from the associated staging diskgroup; and
   migrating, by the second computing device, associated staging diskgroup data to the shared storage using rebalancing after shared storage is repaired, wherein rebalancing includes spreading the staging diskgroup data evenly across all disks in a diskgroup associated with the repaired shared storage.

4. The computerized method of claim 2, further comprising provisioning the clustered database for test and development, wherein provisioning the clustered database for test and development comprises:
   receiving, by the first computing device, fourth data associated with a request for provisioning a portion of the clustered database for test and development, the request including a diskgroup name associated with the portion of the provisioned portion of the clustered database;
   receiving, by the first computing device, an IP address associated with a plurality of test and development nodes;
   mapping, by the first computing device, at least one snapshot associated with the requested portion of the clustered database to the plurality of test and development nodes;
   adding, by a third computing device, the mapped at least one snapshot to a test and development diskgroup associated with the plurality of test and development nodes;
   updating, by the third computing device, header information associated with disks in the test and development diskgroup with the diskgroup name;
   mounting, by the third computing device, the test and development diskgroup to each of the plurality of test and development nodes; and
   executing, by the third computing device, a clone operation from a primary node of the plurality of test and development nodes, wherein executing the clone operation includes creating new parameter files, setting new cluster database names, and communicating with other test and development nodes.

5. The computerized method of claim 4, further comprising:
enabling, by a database server, a listener associated with the provisioned clustered database such that the provisioned clustered database is active, the listener managing requests from a client to the clustered database.

6. A computing system for backing up clustered databases such that production backups associated with the clustered databases are restorable with near zero downtime, the system comprising:
a first processor associated with a first computing device and a second processor associated with a second computing device; and
a first memory coupled to the first processor and a second memory coupled to the second processor, each of the first memory and the second memory including instructions that, when executed by the first processor and the second processor, cause the first processor and the second processor to:
transmit, by the first computing device, first data indicative of a first backup request of a clustered database to a second computing device at a first point in time, the clustered database associated with an application, the clustered database including a plurality of nodes, each of the plurality of nodes including database data from a shared storage associated with the clustered database,
map, by the first computing device, first backup staging disks to each of the plurality of nodes,
add, by the second computing device, the mapped first backup staging disks to a first backup staging diskgroup on a primary node of the plurality of nodes,
mount, by the second computing device, the first backup staging diskgroup to each of the plurality of nodes,
execute, by the second computing device, one of:
a full backup from the primary node to the first backup staging diskgroup when load balancing is not configured, and
a full backup from the primary node and at least one of the other plurality of nodes to the first backup staging diskgroup when load balancing is configured such that the full backup is representative of shared storage data at the first point in time,
transmit, by the second computing device, a catalog of first backup information to a database associated with the first computing device, and
create, by the first computing device, a first snapshot of the first backup staging disk,
thereby backing up clustered databases such that production backups associated with the clustered databases are restorable with near zero downtime.

7. The computing system of claim 6, wherein the first processor and the second processor are further caused to:
transmit, by the first computing device, second data indicative of a second backup request of the clustered database to a second computing device at a second point in time; and
when a second backup request size of the application is larger than a first backup request size of the application, the second backup request size associated with the second backup request and the first backup request size associated with the first backup request:
add, by the first computing device, additional staging disks to the first backup staging disks to form second backup staging disks to account for an expansion of size associated with the application,
map, by the first computing device, the second backup staging disks to each of the plurality of nodes,
add, by the second computing device, the additional staging disks to the first backup staging diskgroup to form a second backup staging diskgroup,
mount, by the second computing device, the second backup staging diskgroup to each of the plurality of nodes,
execute, by the second computing device, incremental backup from each of the other plurality of nodes to the second backup staging diskgroup such that the incremental backup is representative of shared storage data at the second point in time, the incremental backup including backup of difference data, the difference data associated with changes to the application data between the first point in time and the second point in time,
transmit, by the second computing device, a catalog of second backup information to the database associated with the first computing device, and
create, by the first computing device, a second snapshot of the second backup staging disk.

8. The computing system of claim 7, wherein the first processor and second processor are further configured to restore the shared storage data when the shared storage is corrupted, wherein restoring the shared storage data comprises further causing the first processor and the second processor to:
receive, by the first computing device, third data associated with a request for restoring the shared storage data associated with at least one of the first snapshot and the second snapshot;
map, by the first computing device, the requested snapshots to the plurality of nodes;
mount, by the second computing device, an associated staging diskgroup to the plurality of nodes;
switch, by the second computing device, the clustered database to run from the associated staging diskgroup; and
migrate, by the second computing device, associated staging diskgroup data to the shared storage using rebalancing after shared storage is repaired, wherein rebalancing includes spreading the staging diskgroup data evenly across all disks in a diskgroup associated with the repaired shared storage.

9. The computing system of claim 7, wherein the first processor and second processor are further configured to provision the clustered database for test and development, wherein provisioning the clustered database for test and development comprises further causing the first processor and the second processor to:
receive, by the first computing device, fourth data associated with a request for provisioning a portion of the clustered database for test and development, the request including a diskgroup name associated with the portion of the provisioned portion of the clustered database;
receive, by the first computing device, an IP address associated with a plurality of test and development nodes;
map, by the first computing device, at least one snapshot associated with the requested portion of the clustered database to the plurality of test and development nodes;
add, by a third computing device, the mapped at least one snapshot to a test and development diskgroup associated with the plurality of test and development nodes;

update, by the third computing device, header information associated with disks in the test and development diskgroup with the diskgroup name;

mount, by the third computing device, the test and development diskgroup to each of the plurality of test and development nodes; and execute, by the third computing device, a clone operation from a primary node of the plurality of test and development nodes, wherein executing the clone operation includes creating new parameter files, setting new cluster database names, and communicating with other test and development nodes.

10. The computing system of claim 9, further comprising a database server, wherein the database server is configured to enable a listener associated with the provisioned clustered database such that the provisioned clustered database is active, the listener managing requests from a client to the clustered database.

\* \* \* \* \*